US012701055B2

(12) United States Patent
Babaei

(10) Patent No.: US 12,701,055 B2
(45) Date of Patent: Aug. 4, 2026

(54) QUALITY OF EXPERIENCE MEASUREMENT IN RESPONSE TO A RESUME PROCEDURE

(71) Applicant: Toyota Jidosha Kabushiki Kaisha, Toyota (JP)

(72) Inventor: Alireza Babaei, Fairfax, VA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 19/236,918

(22) Filed: Jun. 12, 2025

(65) Prior Publication Data

US 2025/0317369 A1      Oct. 9, 2025

Related U.S. Application Data

(63) Continuation of application No. 18/577,162, filed as application No. PCT/JP2022/034946 on Sep. 20, 2022.

(Continued)

(51) Int. Cl.
| | |
|---|---|
| *H04L 41/5009* | (2022.01) |
| *H04W 24/08* | (2009.01) |
| *H04W 76/27* | (2018.01) |

(52) U.S. Cl.
CPC ......... *H04L 41/5009* (2013.01); *H04W 24/08* (2013.01); *H04W 76/27* (2018.02)

(58) Field of Classification Search
CPC ............. H04L 41/5009; H04L 41/0806; H04L 41/5067; H04W 24/08; H04W 76/27; H04W 48/12; H04W 24/10
See application file for complete search history.

(56) References Cited

U.S. PATENT DOCUMENTS

| | | |
|---|---|---|
| 2013/0128756 A1 | 5/2013 | Zhang et al. |
| 2023/0209463 A1* | 6/2023 | Shih .................. H04W 52/0216 |
| | | 370/311 |

(Continued)

FOREIGN PATENT DOCUMENTS

| | | |
|---|---|---|
| WO | WO 2021/028397 A1 | 2/2021 |
| WO | WO 2021/163394 A1 | 8/2021 |

OTHER PUBLICATIONS

"3GPP TSG-RAN WG2 Meeting #114-e, Qualcomm, QoE pauge and resume handling, 8.14 NR QoE, R2-2107817" (hereinafter as "R2-2107817") (Year: 2021).*

(Continued)

*Primary Examiner* — Charles C Jiang
*Assistant Examiner* — Thad N Defauw
(74) *Attorney, Agent, or Firm* — Finnegan, Henderson, Farabow, Garrett & Dunner LLP

(57)      ABSTRACT

A method of quality of experience (QoE) measurement and reporting, includes: receiving, by a user equipment (UE), a first radio resource control (RRC) message comprising first configuration parameters of a first QoE configuration and second configuration parameters of a second QoE configuration; receiving, by the UE, an RRC release message indicating transitioning of the UE from an RRC connected state to an RRC inactive state, wherein the UE is in a connected state when the RRC release message is received; receiving, by the UE, from a second BS, an RRC resume message indicating transitioning of the UE from the RRC inactive state to the RRC connected state, wherein the UE is in an inactive state when the RRC resume message is received; and in response to receiving the RRC resume message, releasing the first QoE configuration and resuming the second QoE configuration.

19 Claims, 23 Drawing Sheets

Related U.S. Application Data

(60) Provisional application No. 63/246,564, filed on Sep. 21, 2021.

(56) References Cited

U.S. PATENT DOCUMENTS

| | | | |
|---|---|---|---|
| 2024/0188175 A1* | 6/2024 | Liu | .................... H04W 76/27 |
| 2024/0196458 A1 | 6/2024 | Teyeb et al. | |
| 2025/0081047 A1 | 3/2025 | Wu et al. | |
| 2025/0344283 A1 | 11/2025 | Kim et al. | |

OTHER PUBLICATIONS

"3GPP TSG-RAN WG2 Meeting #115 electronic Online, Aug. 2021, 8.14.2.1, CMCC, More considerations on configuration and reporting, R2-2108514" (hereinafter as "R2-2108514") (Year: 2021).*

"3GPP TSG-RAN WG2 Meeting #113-e, Electronic, Jan. 25- Feb. 5, 2021, Qulacomm, Handling of NR QOE measurements, 8.14 NR QoE SI, R2-2101338" (hereinafter as "R2-2101338") (Year: 2021).*

"3GPP Tsg-Ran WG2 Meeting #115, Online, Aug. 9-27, 2021, 8.14.2.1, R2-2109105, Huawei, HiSilicon, Report of offline: [ AT115-e][046][QoE] Mobility (Huawei), NR_QoE-Core-Release 17" (hereinafter as R2-2109105) (Year: 2021).*

Huawei, "Report of offline: [AT115-e][046][QoE] Mobility (Huawei)" 3GPP Draft; R2-2109105, 3rd Generation Partnership Project (3GPP), Mobile Competence Centre; 650, Route Des Lucioles; F-06921 Shophia-Antipolis Cedex; France, Aug. 24, 2021, 22 pgs.

3rd Generation Partnership Project (3GPP), "3rd Generation Partnership Project; Technical Specification Group Radio Access Network; Study on NR QoE (Quality of Experience) management and optimizations for diverse services (Release 17)", 3GPP Standard; Technical Report; 3GPP TR 38.890, Mobile Competence Centre; 650, Route Des Lucioles; F-06921 Shophia-Antipolis Cedex; France, Apr. 9, 2021, pp. 1-18.

Catt, "Discussion on Alignment of MDT and QoE Measurements", 3CPP Draft; R3-211841, 3rd Generation Partnership Project (3GPP), Mobile Competence Centre, 650, Route Des Lucioles, F-06921 Sophia-Antipolis Cedex; France, May 7, 2021, 4 pgs.

Qualcomm Incorporated, "Handling of NR QoE measurements", 3GPP Draft; R2-2101338, 3rd Generation Partnership Project (3GPP), Mobile Competence Centre, 650, Route Des Lucioles, F-06921 Sophia-Antipolis Cedex; France, Jan. 15, 2021, 4 pgs.

3GPP TS 38.331, "3rd Generation Partnership Project; Technical Specification Group Radio Access Network; NR; Radio Resource Control (RRC) protocol specification", 3GPP TS 38.331 version 16.5.0 Release 16, (Jun. 2021), 959 pages, (part 1, pp. 1-320).

3GPP TS 38.331, "3rd Generation Partnership Project; Technical Specification Group Radio Access Network; NR; Radio Resource Control (RRC) protocol specification", 3GPP TS 38.331 version 16.5.0 Release 16, (Jun. 2021), 959 pages, (part 2, pp. 321-640).

3GPP TS 38.331, "3rd Generation Partnership Project; Technical Specification Group Radio Access Network; NR; Radio Resource Control (RRC) protocol specification", 3GPP TS 38.331 version 16.5.0 Release 16, (Jun. 2021), 959 pages, (part 3, pp. 641-959).

3GPP TSG-RAN WG2 Meeting #113-e Electronic, R2-2101339, "Handling of NR QoE reporting," Jan. 15, 2021, 6 Pages.

3GPP TSG-RAN WG2 Meeting #113bis-e, R2-2102958, "QoE measurement configuration and reporting," Apr. 2, 2021, 7 pages.

3GPP TSG RAN WG2 Meeting #114-e, R2-2105581, "QoE measurement handling at RAN overload," May 11, 2021, 12 Pages.

3GPP TSG RAN WG3 Meeting #113-e, R3-213491, "Ran visible QoE configuration and reporting," Aug. 6, 2021, 5 Pages.

3GPP TSG RAN WG2 Meeting #114-e, R2-2105646, "Discussion on NR QoE," May 11, 2021, 6 Pages.

3GPP TSG RAN WG2 Meeting #115, "[Pre115-e][008][QoE] Summary Support for Mobility," R2-2109036, Aug. 30. 2021, 6 pages.

Non Final Office Action issued in U.S. Patent Application No. 18/577, 162, dated Dec. 31, 2025.

* cited by examiner

| Physical channel / Transport channel | PDSCH | PDCCH | PBCH |
|---|---|---|---|
| BCH | | | X |
| PCH | X | | |
| DL-SCH | X | | |

| Physical channel / Transport channel | PUSCH | PUCCH | PRACH |
|---|---|---|---|
| UL-SCH | X | | |
| RACH | | | X |

| Physical channel / Transport channel | PSSCH | PSCCH | PSFCH | PSBCH |
|---|---|---|---|---|
| SL-BCH | | | | X |
| SL-SCH | X | | | |

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

QUALITY OF EXPERIENCE MEASUREMENT IN RESPONSE TO A RESUME PROCEDURE

CROSS-REFERENCE TO RELATED APPLICATIONS

This application is a continuation of U.S. patent application Ser. No. 18/577,162, which is a national stage of International Application No. PCT/JP2022/034946, filed Sep. 20, 2022, which claims the benefit of priority from U.S. Patent Application No. 63/246,564, filed Sep. 21, 2021, each of which is hereby incorporated by reference herein in its entirety.

TECHNICAL FIELD

The disclosure relates to a method of quality of experience (QoE) measurement and reporting.

BACKGROUND ART

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

SUMMARY OF INVENTION

One of embodiments of the invention is a method of quality of experience (QoE) measurement and reporting. The method includes: receiving, by a user equipment (UE), a first radio resource control (RRC) message comprising first configuration parameters of a first QoE configuration and second configuration parameters of a second QoE configuration; receiving, by the UE, an RRC release message indicating transitioning of the UE from an RRC connected state to an RRC inactive state, wherein the UE is in a connected state when the RRC release message is received; receiving, by the UE, from a second BS, an RRC resume message indicating transitioning of the UE from the RRC inactive state to the RRC connected state, wherein the UE is in an inactive state when the RRC resume message is received; and in response to receiving the RRC resume message, releasing the first QoE configuration and resuming the second QoE configuration.

One of embodiments of the invention is a method of quality of experience (QoE) measurement and reporting. The method includes: receiving, by a user equipment (UE) a first radio resource control (RRC) message comprising configuration parameters of a QoE configuration; receiving an RRC release message indicating transitioning of the UE from an RRC connected state to an RRC inactive state; receiving, by the UE, an RRC resume message indicating transitioning of the UE from the RRC inactive state to the RRC connected state; and determining to discard or maintain a QoE measurement report associated with the QoE configuration in response to the RRC resume message indicating that at least one first configuration parameter of the configuration parameters is updated.

One of embodiments of the invention is a method of quality of experience (QoE) measurement and reporting. The method includes: transmitting, by a network, a first radio resource control (RRC) message comprising first configuration parameters of a first QoE configuration and second configuration parameters of a second QoE configuration; transmitting, by the network, an RRC release message indicating transitioning of a user equipment (UE) from an RRC connected state to an RRC inactive state, wherein the UE is in a connected state when the RRC release message is received; transmitting, by the network, from a second BS, an RRC resume message indicating transitioning of the UE from the RRC inactive state to the RRC connected state, wherein the UE is in an inactive state when the RRC resume message is received; and wherein in response to receiving the RRC resume message, the first QoE configuration is released and the second QoE configuration is resumed.

One of embodiments of the invention is a method of quality of experience (QoE) measurement and reporting. The method includes: transmitting, by a network, a first radio resource control (RRC) message comprising configuration parameters of a QoE configuration; receiving an RRC release message indicating transitioning of a user equipment (UE) from an RRC connected state to an RRC inactive state; and transmitting, by a network, an RRC resume message indicating transitioning of the UE from the RRC inactive state to the RRC connected state, the UE determining to discard or maintain a QoE measurement report associated with the QoE configuration in response to the RRC resume message indicating that at least one first configuration parameter of the configuration parameters is updated.

BRIEF DESCRIPTION OF DRAWINGS

FIG. 6 shows example physical signals in downlink, uplink and sidelink according to some aspects of some of various exemplary embodiments of the present disclosure.

DESCRIPTION OF EMBODIMENTS

Figure 1:
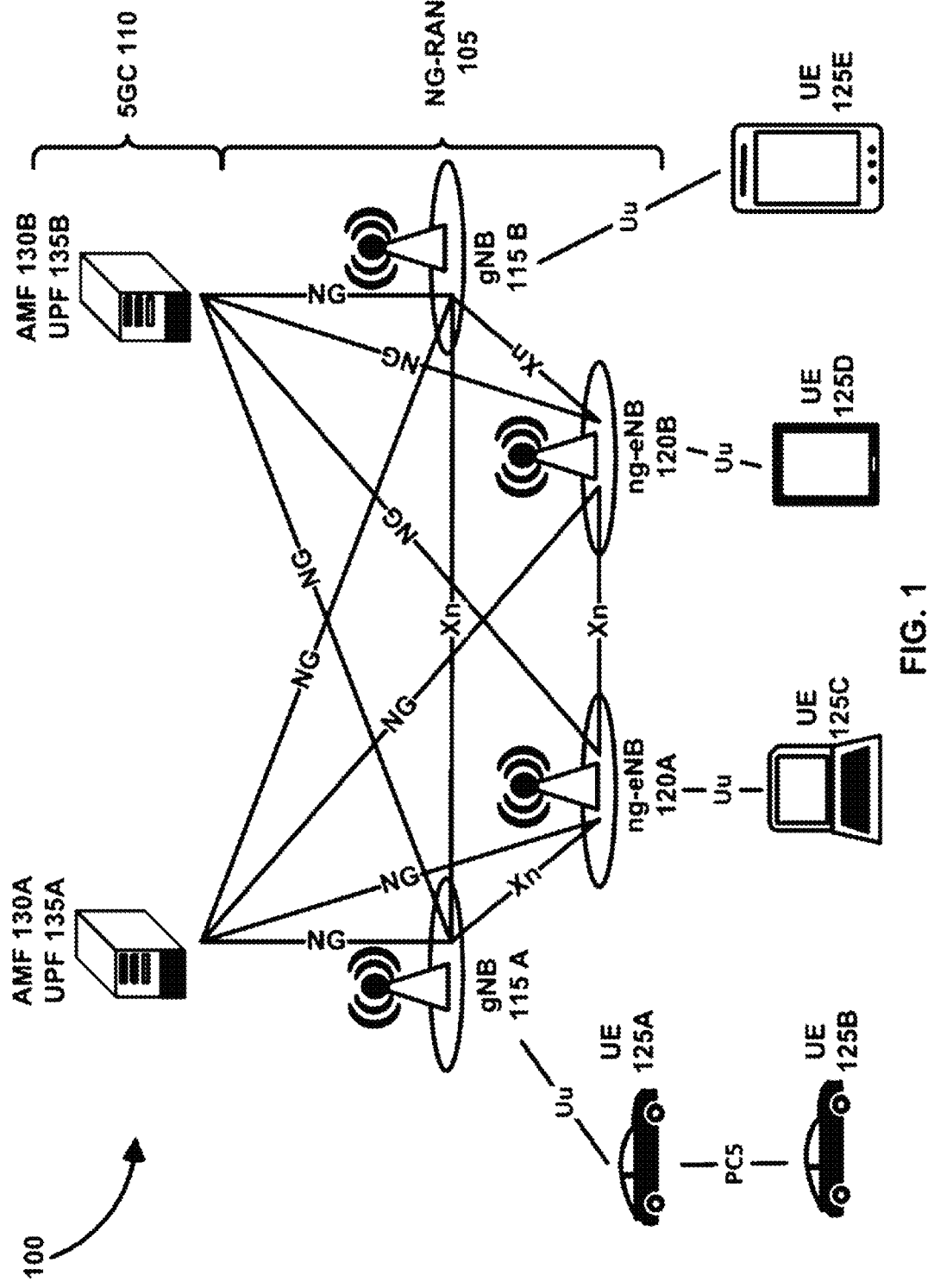
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IoT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IoT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The PAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the PAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two-bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two-bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5

Link Identifier may be used to indicate the PC5 unicast link whose sidelink Radio Link failure (RLF) declaration was made and PC5-RRC connection was released.

Figure 2A:
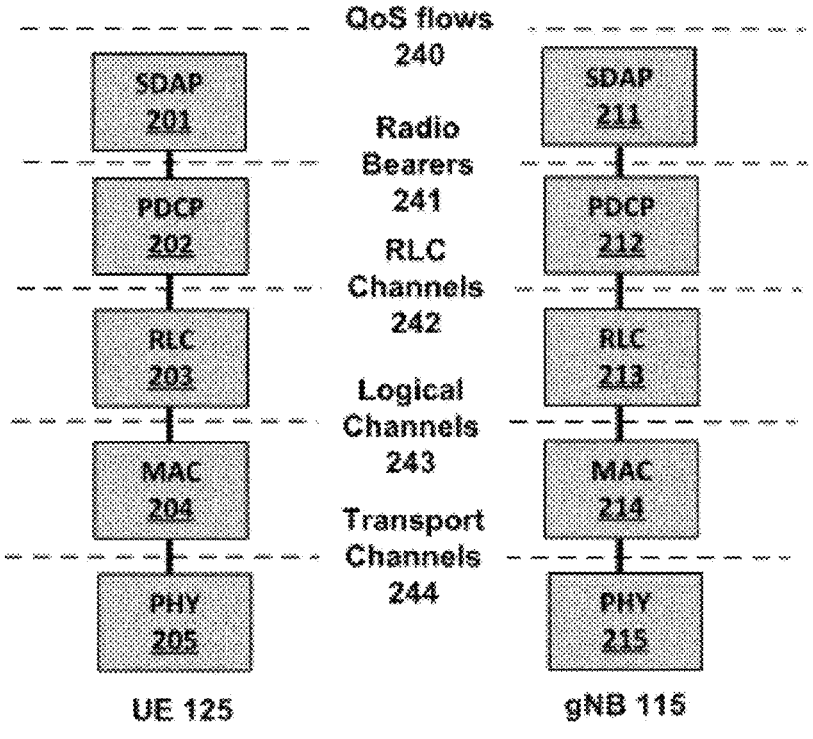
FIG. 2A and FIG. 2B show examples of radio protocol stacks for user plane and control plane, respectively, according to some aspects of some of various exemplary embodiments of the present disclosure.
Figure 2B:
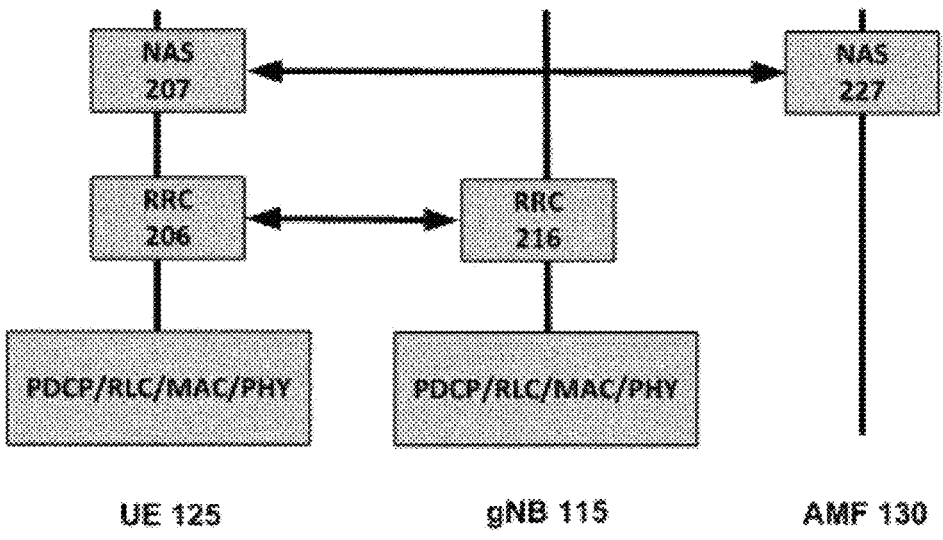

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as Li).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AN only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

Figures 3A, 3B, 3C:
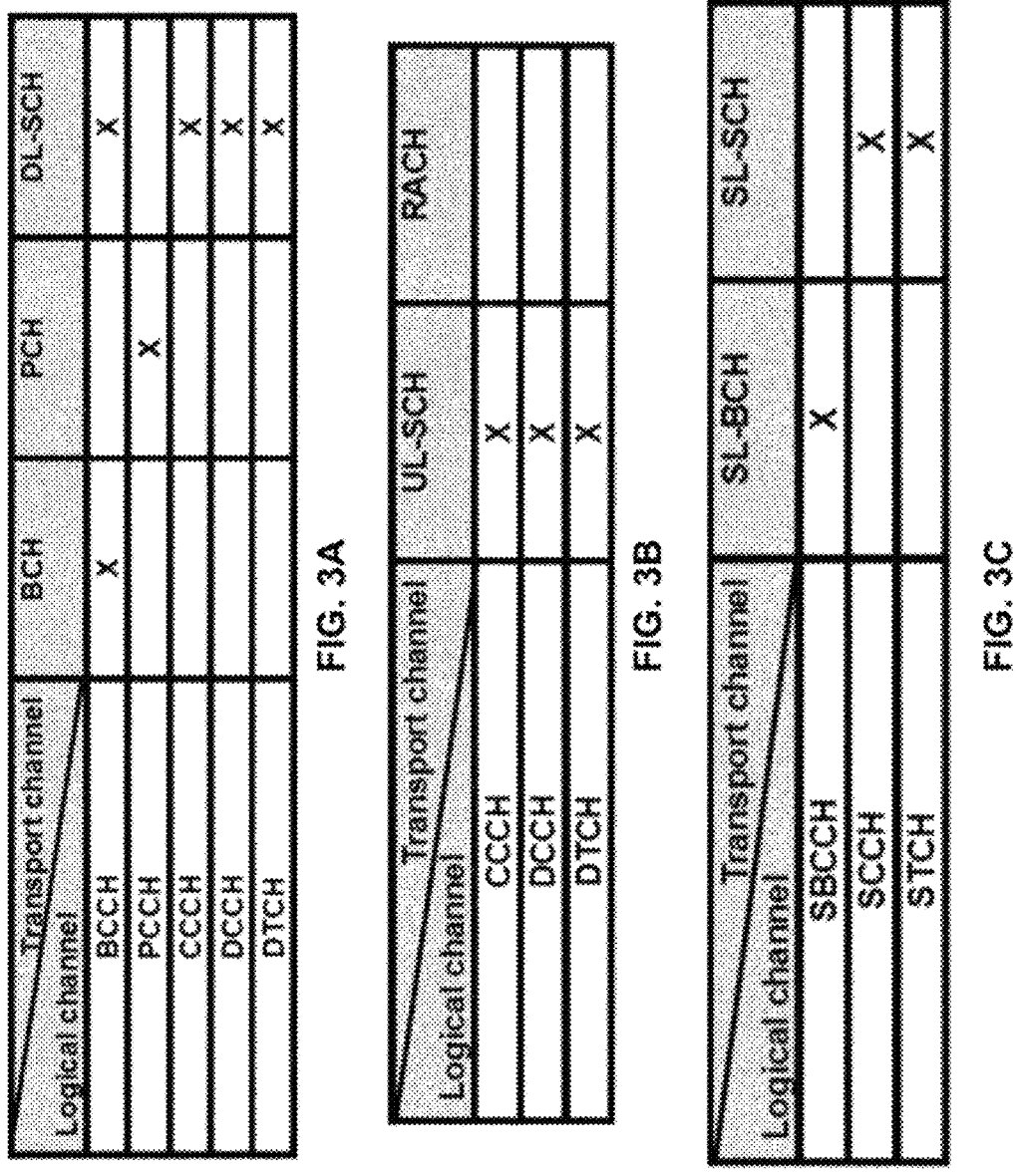
FIG. 3A, FIG. 3B and FIG. 3C show example mappings between logical channels and transport channels in downlink, uplink and sidelink, respectively, according to some aspects of some of various exemplary embodiments of the present disclosure.

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

Figures 4A, 4B, 4C:
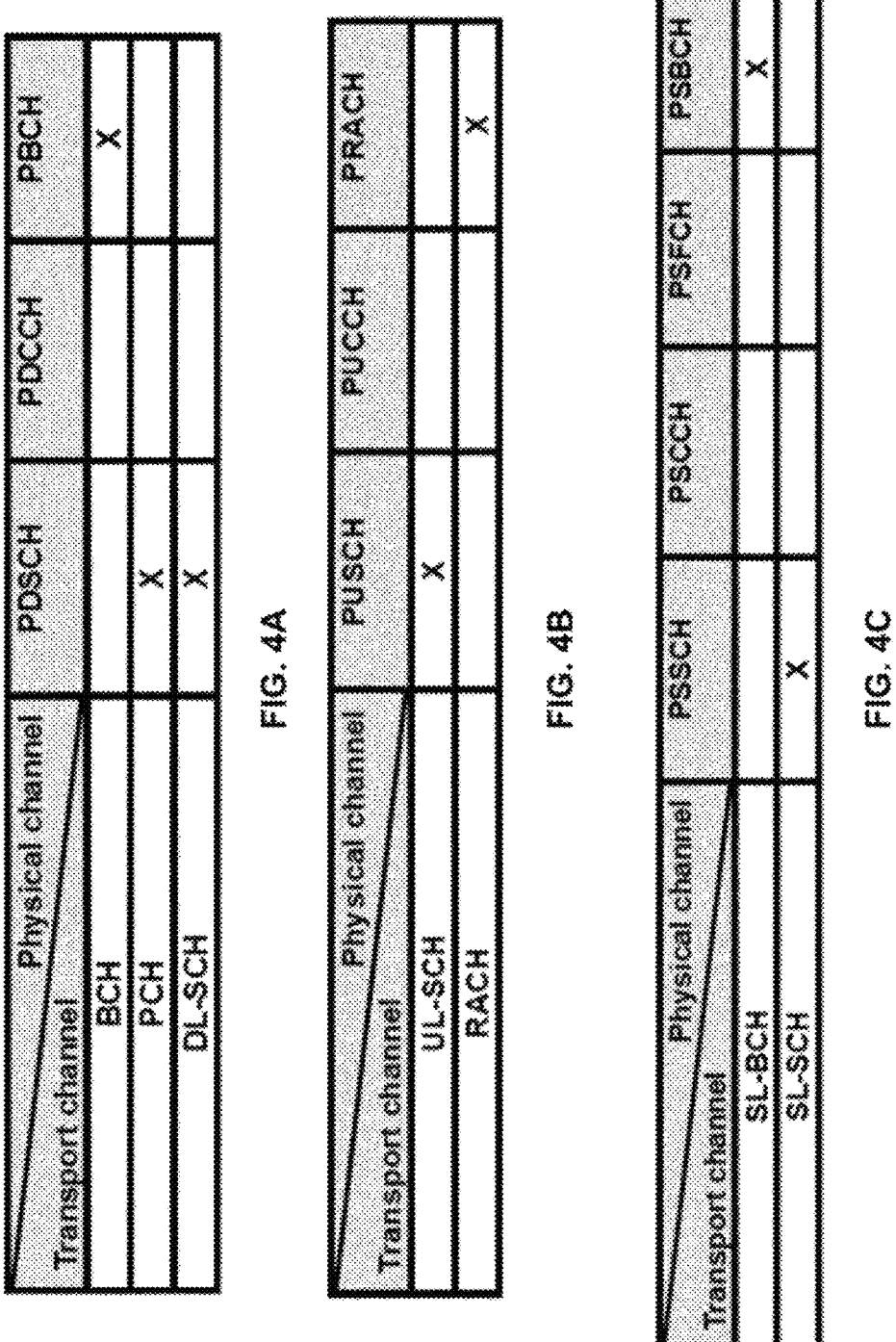
FIG. 4A, FIG. 4B and FIG. 4C show example mappings between transport channels and physical channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may be mapped to the PSCCH.

Figures 5A, 5B, 5C, 5D:
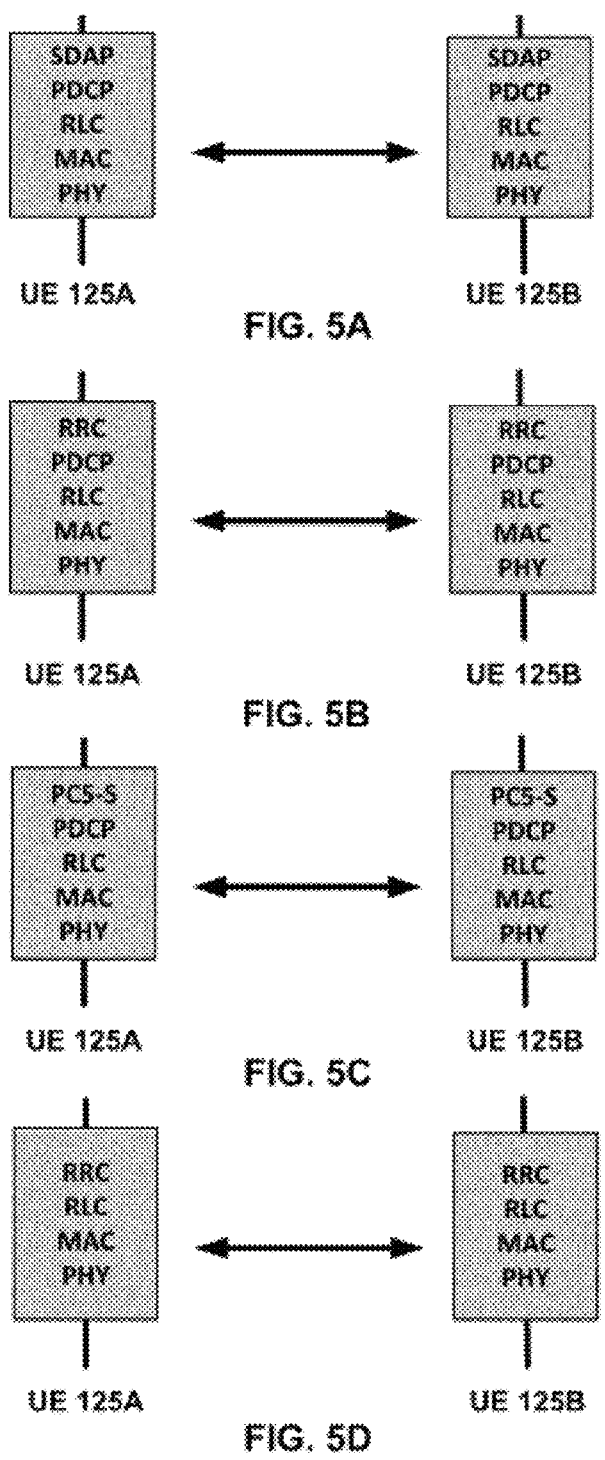
FIG. 5A, FIG. 5B, FIG. 5C and FIG. 5D show examples of radio protocol stacks for NR sidelink communication according to some aspects of some of various exemplary embodiments of the present disclosure.

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
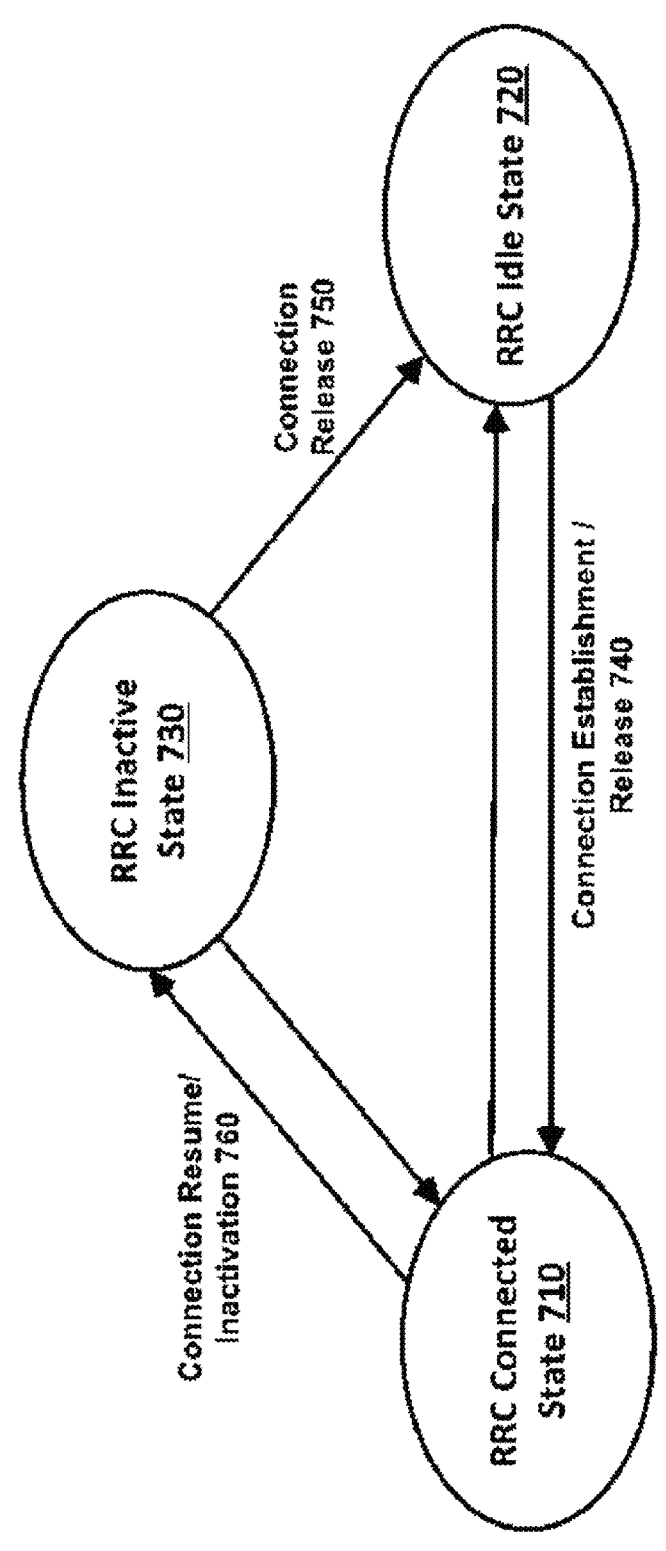
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
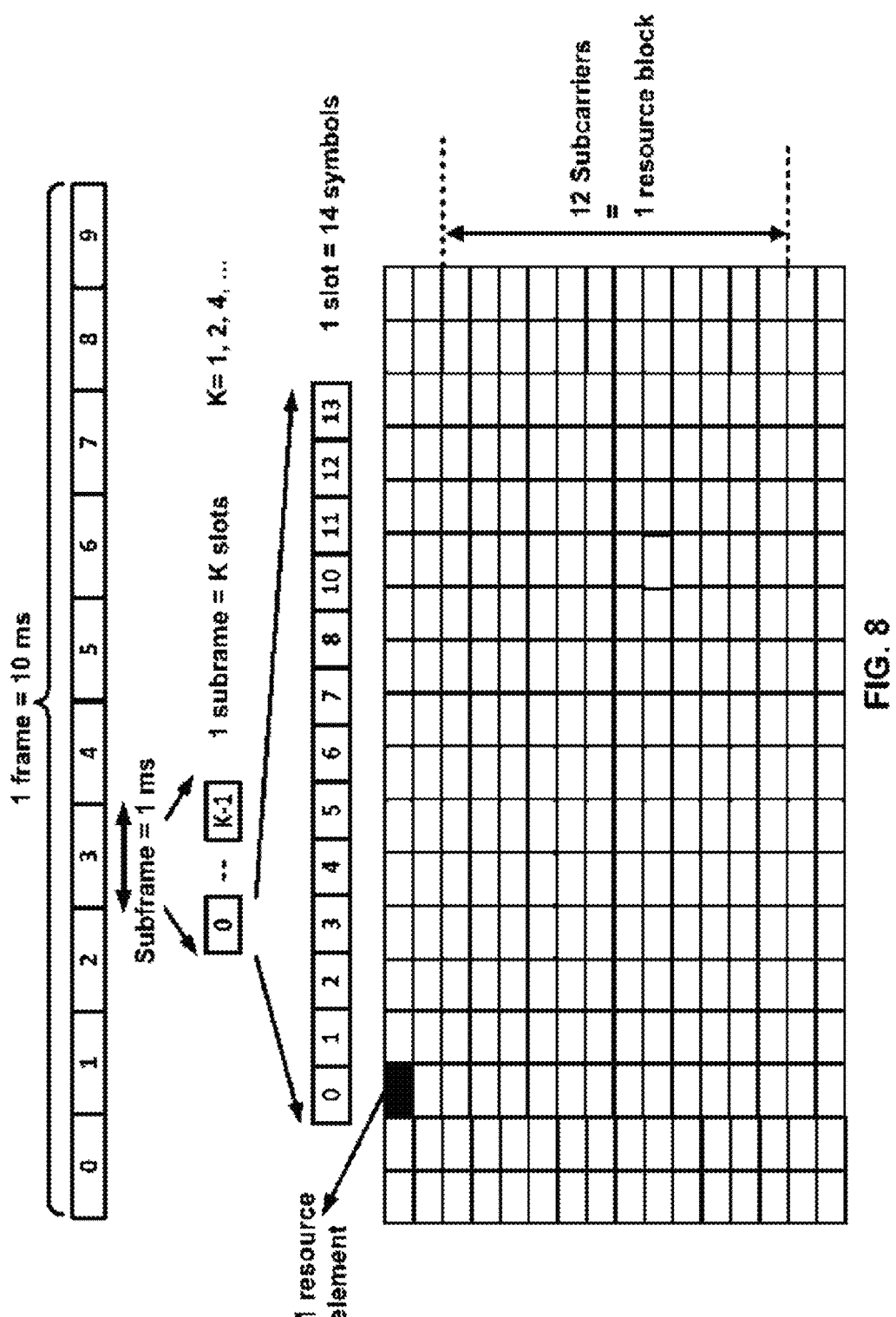
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend on the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
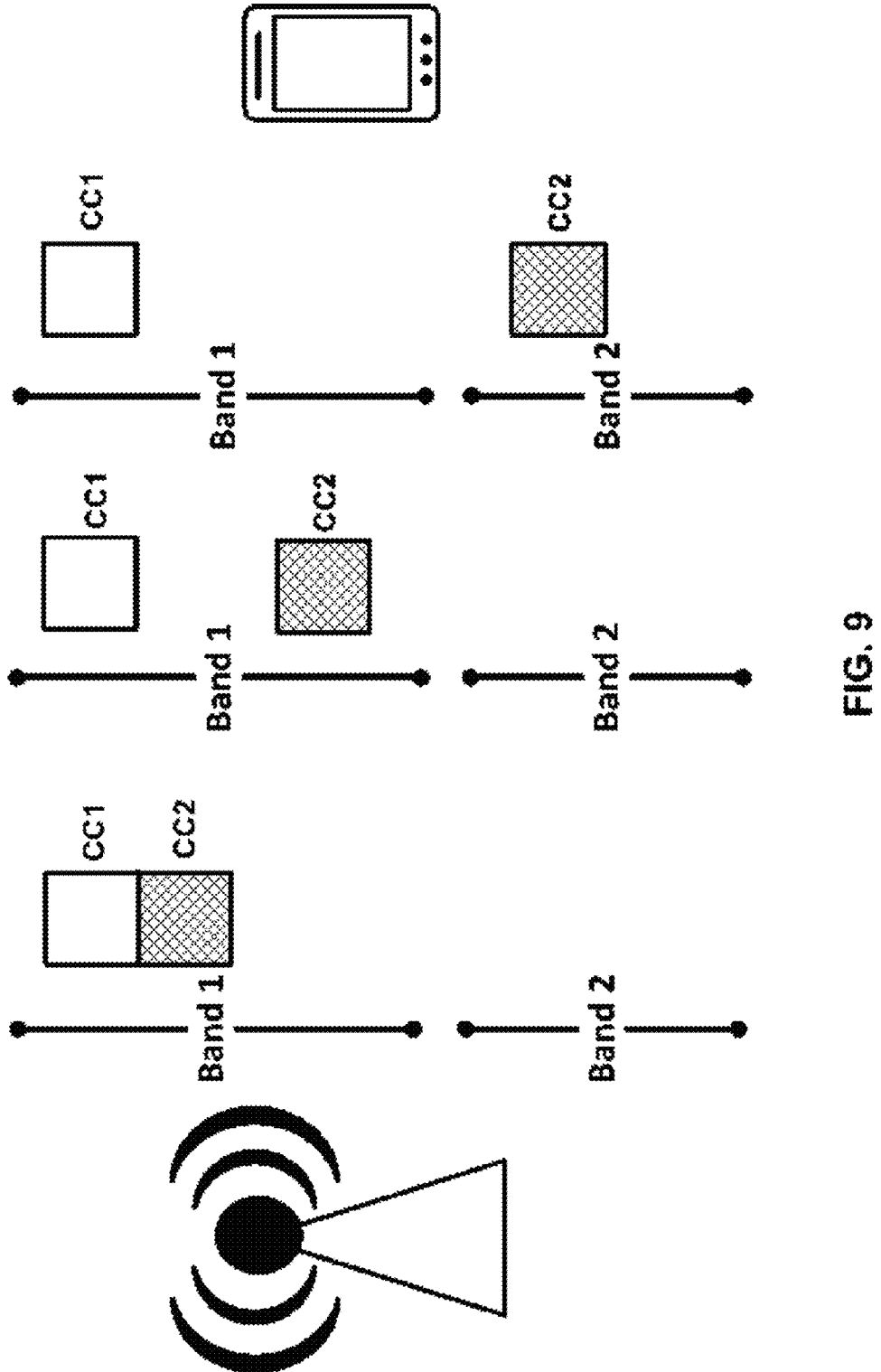
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the Li synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the Li can be synchronized or not: when the timer is running, the Li may be considered synchronized, otherwise, the Li may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
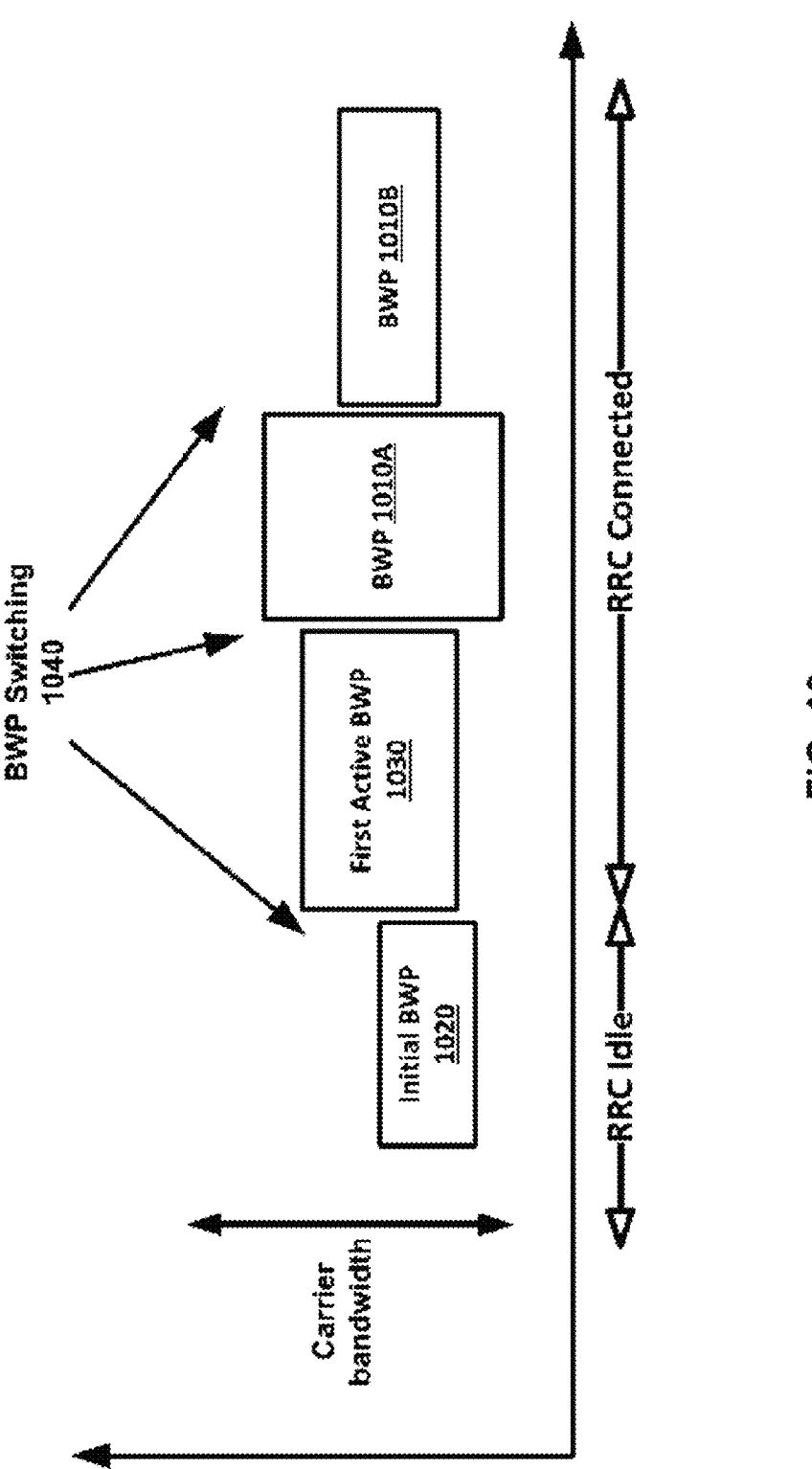
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
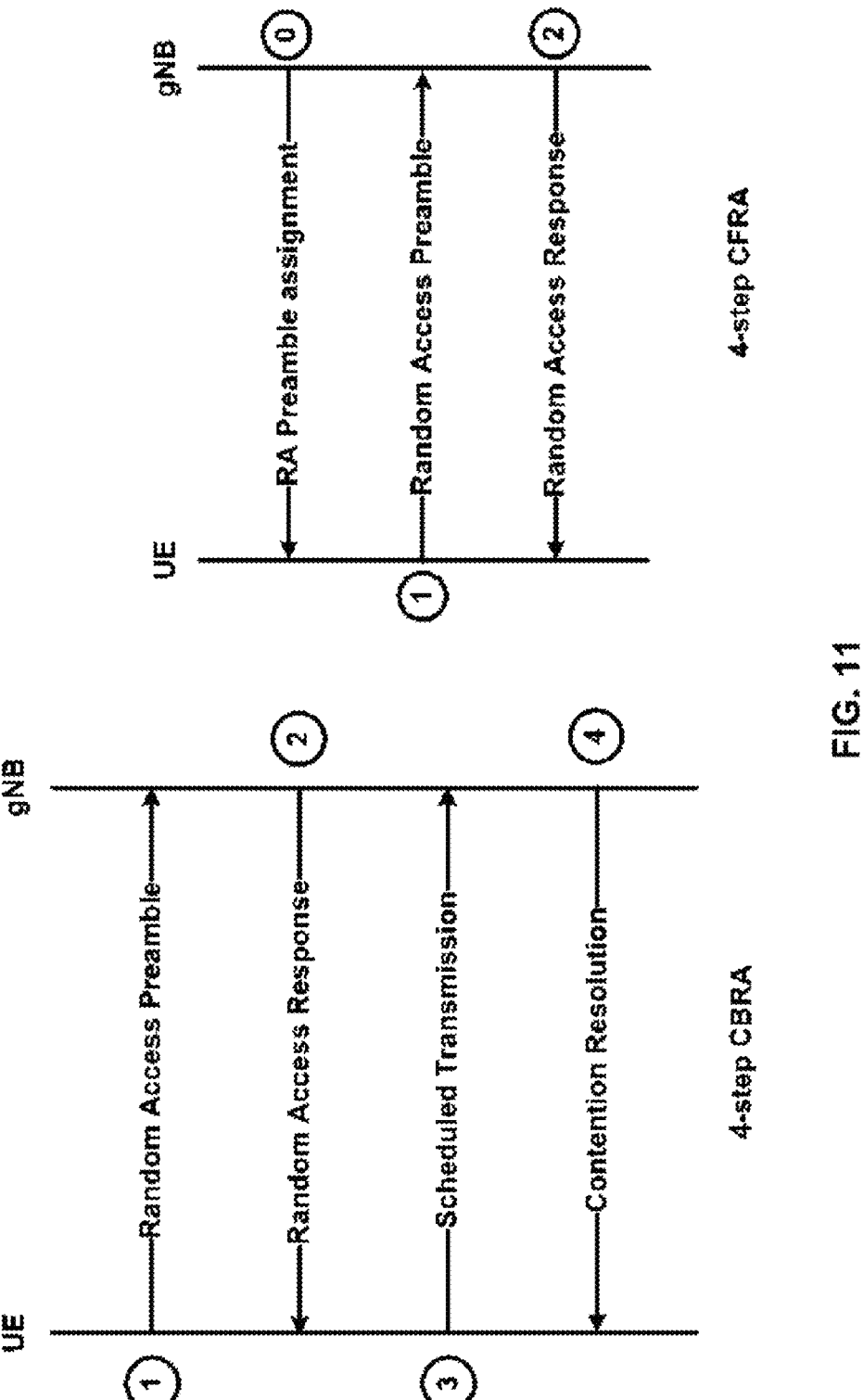
FIG. 11 shows example four-step contention-based and contention-free random access processes according to some aspects of some of various exemplary embodiments of the present disclosure.
Figure 12:
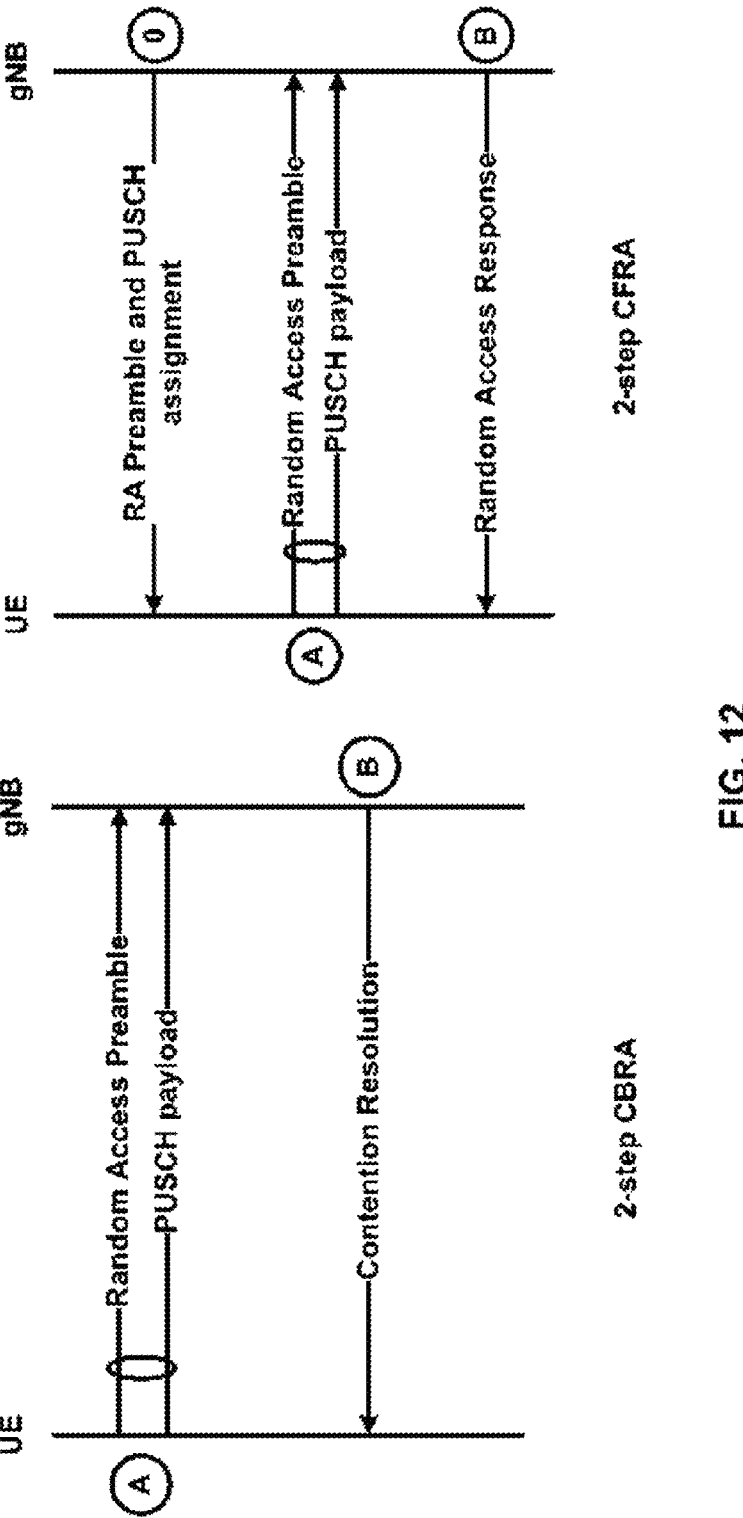
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (PA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
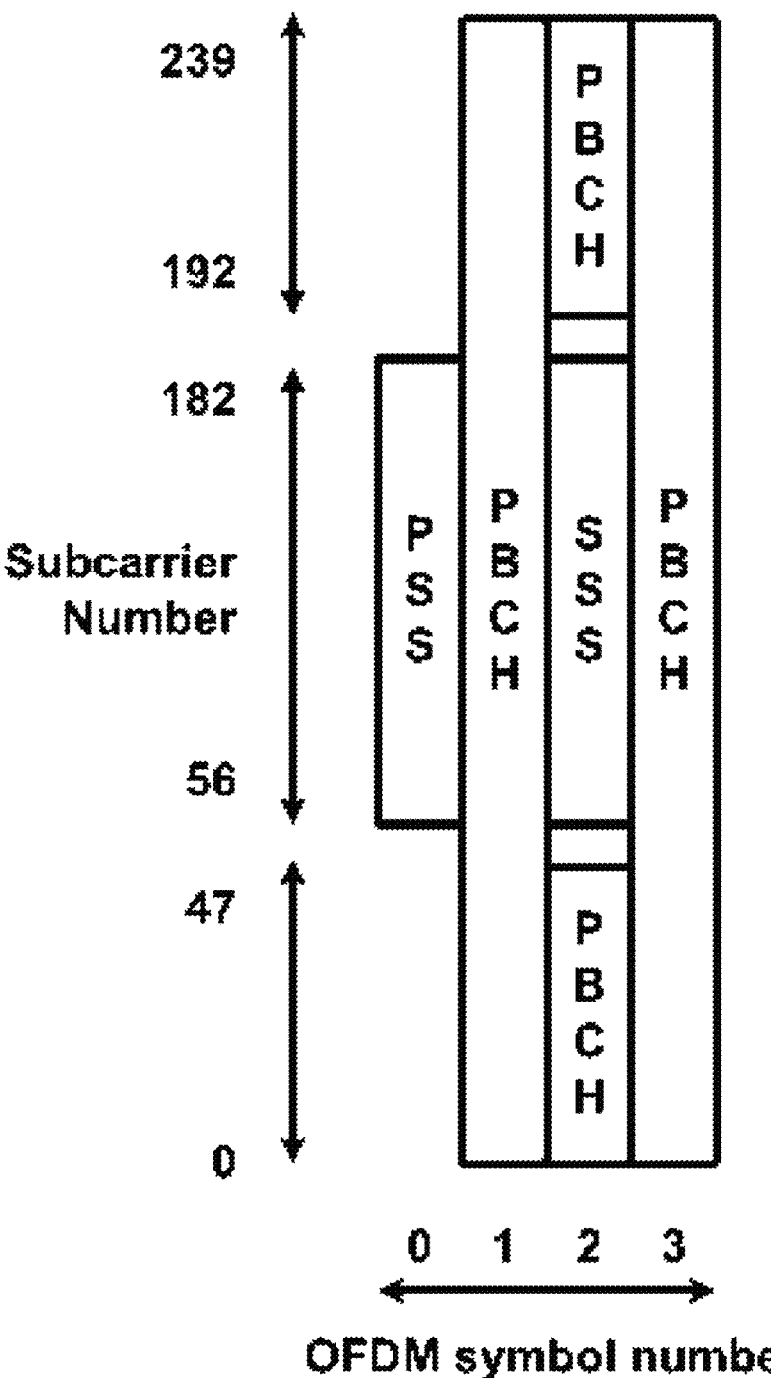
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
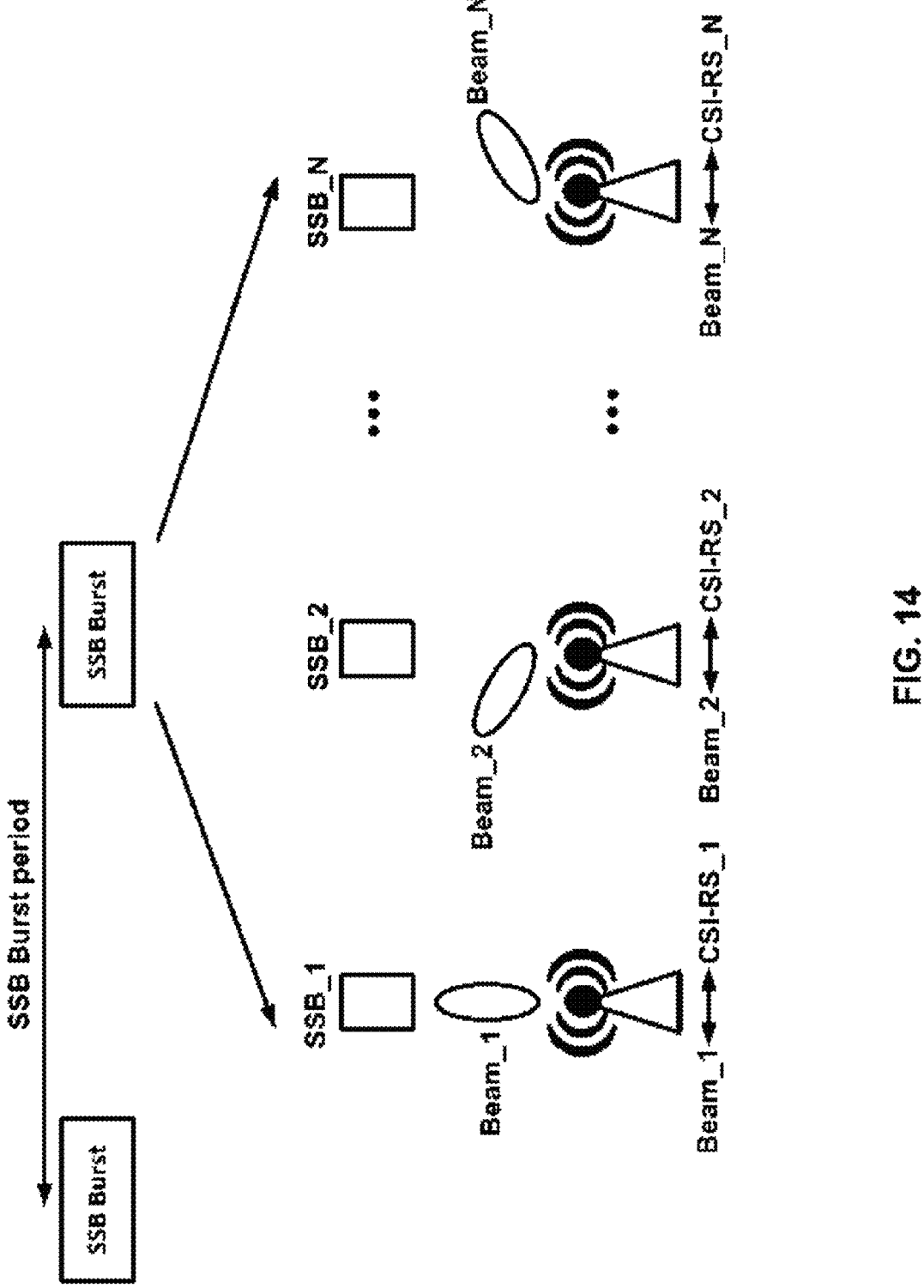
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depend on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
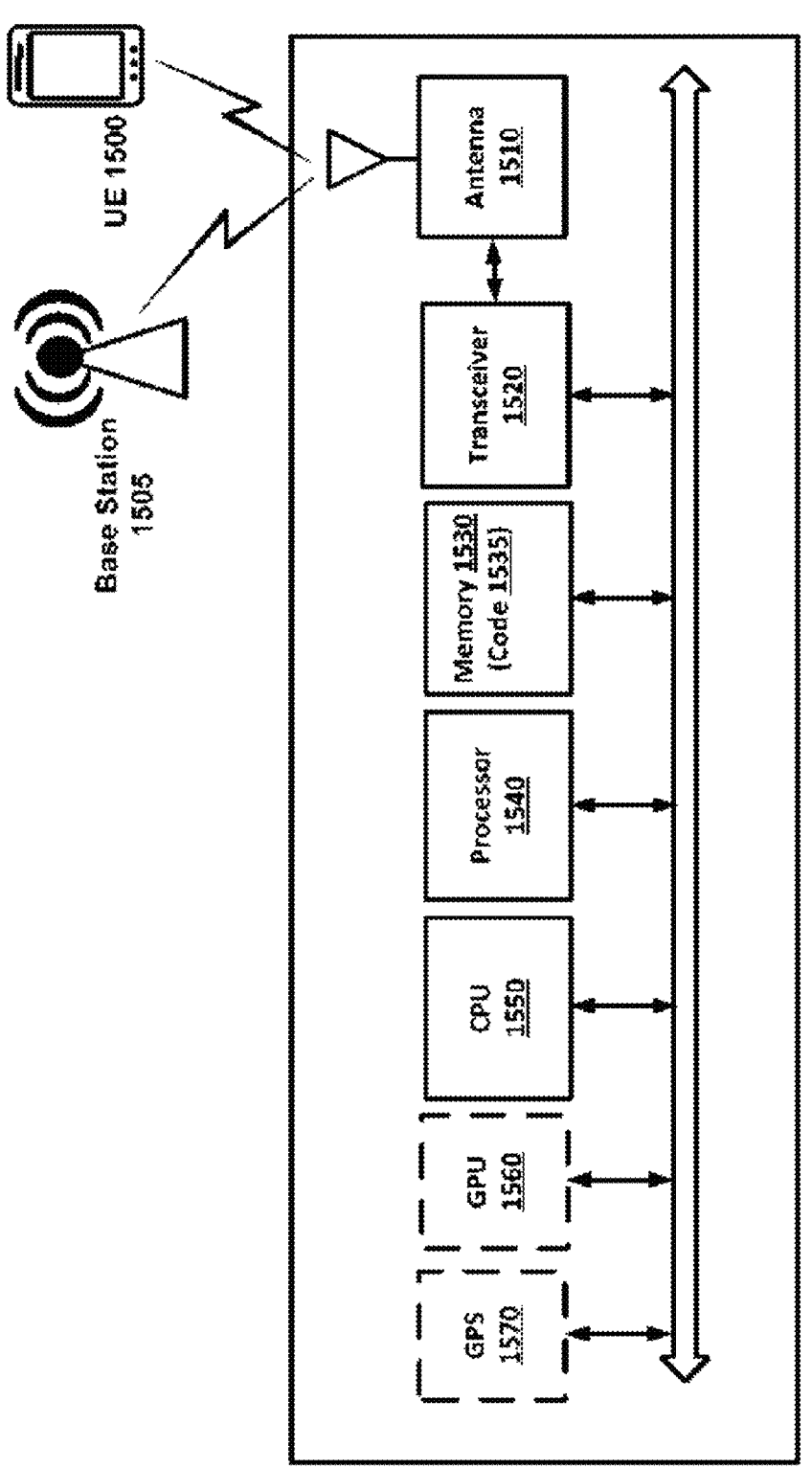
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

Figure 16:
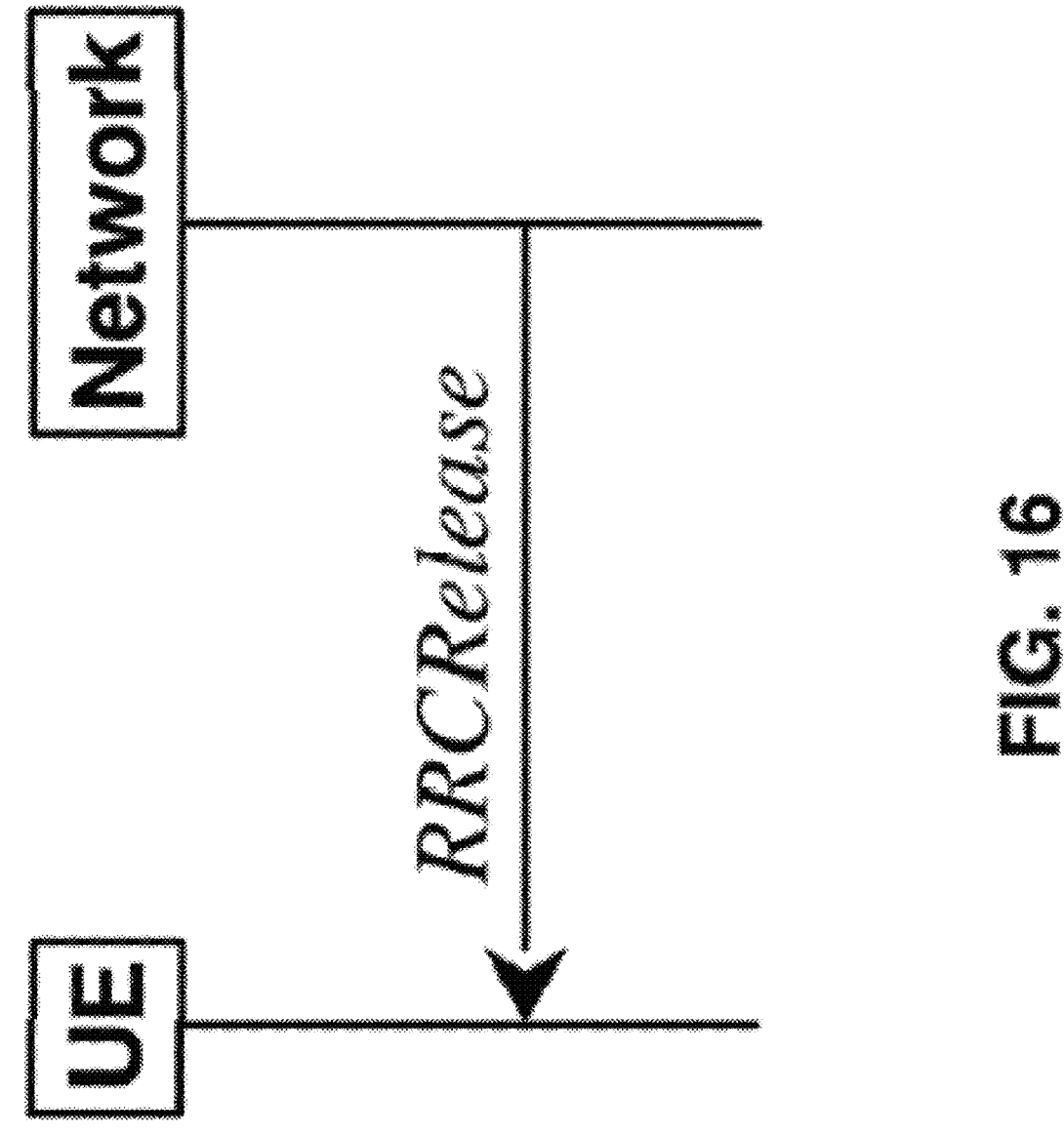
FIG. 16 shows an example RRC connection release with successful operation according to some aspects of some of various exemplary embodiments of the present disclosure.

In some examples, the purpose of a connection release procedure may be to release the RRC connection. Illustratively, this may include the release of the established radio bearers, BH RLC channels as well as all radio resources. Additionally, in some embodiments, this can include to suspend the RRC connection only if SRB2 and at least one DRB or, for IAB, SRB2, are setup, which may include the suspension of the established radio bearers. An example of an RRC connection release with successful operation is shown in FIG. 16.

In some examples, the network may initiate the RRC connection release procedure to transition a UE in RRC-_CONNECTED to RRC_IDLE. In other examples, the network may initiate the RRC connection release procedure to transition a UE in RRC_CONNECTED to RRC_INAC-TIVE only if SRB2 and at least one DRB or, for IAB, SRB2, is setup in RRC_CONNECTED. In still another example, the network may initiate the RRC connection release procedure to transition a UE in RRC_INACTIVE back to RRC_INACTIVE when the UE tries to resume. Still further, in yet another example, the network may initiate the RRC connection release procedure to transition a UE in RRC_I-NACTIVE to RRC_IDLE when the UE tries to resume. In some examples, the procedure may be used to release and redirect a UE to another frequency.

In some examples, a RRCRelease message may be used to command the release of an RRC connection or the suspension of the RRC connection. In some examples, a field/IE suspendConfig may indicate configuration for the RRC_INACTIVE state. The network may not configure suspendConfig when the network redirects the UE to an inter-RAT carrier frequency or if the UE is configured with a DAPS bearer. In some examples, a field/IE ran-NotificationAreaInfo may be used by the network to ensure that the UE in RRC_INACTIVE always has a valid ran-NotificationAreaInfo. In some examples, a field/IE ran-PagingCycle may refer to the UE specific cycle for RAN-initiated paging. A field t380 may refer to the timer that triggers the periodic RNAU procedure in UE.

In some examples, the purpose of an RRC connection resume procedure may be to resume a suspended RRC connection, including resuming SRB(s) and DRB(s) or perform an RNA update.

In some examples, the UE may initiate the procedure when upper layers or AS (when responding to RAN paging, upon triggering RNA updates while the UE is in RRC_I-NACTIVE, or for NR sidelink communication/V2X sidelink communication) may request the resume of a suspended RRC connection.

Figure 17:
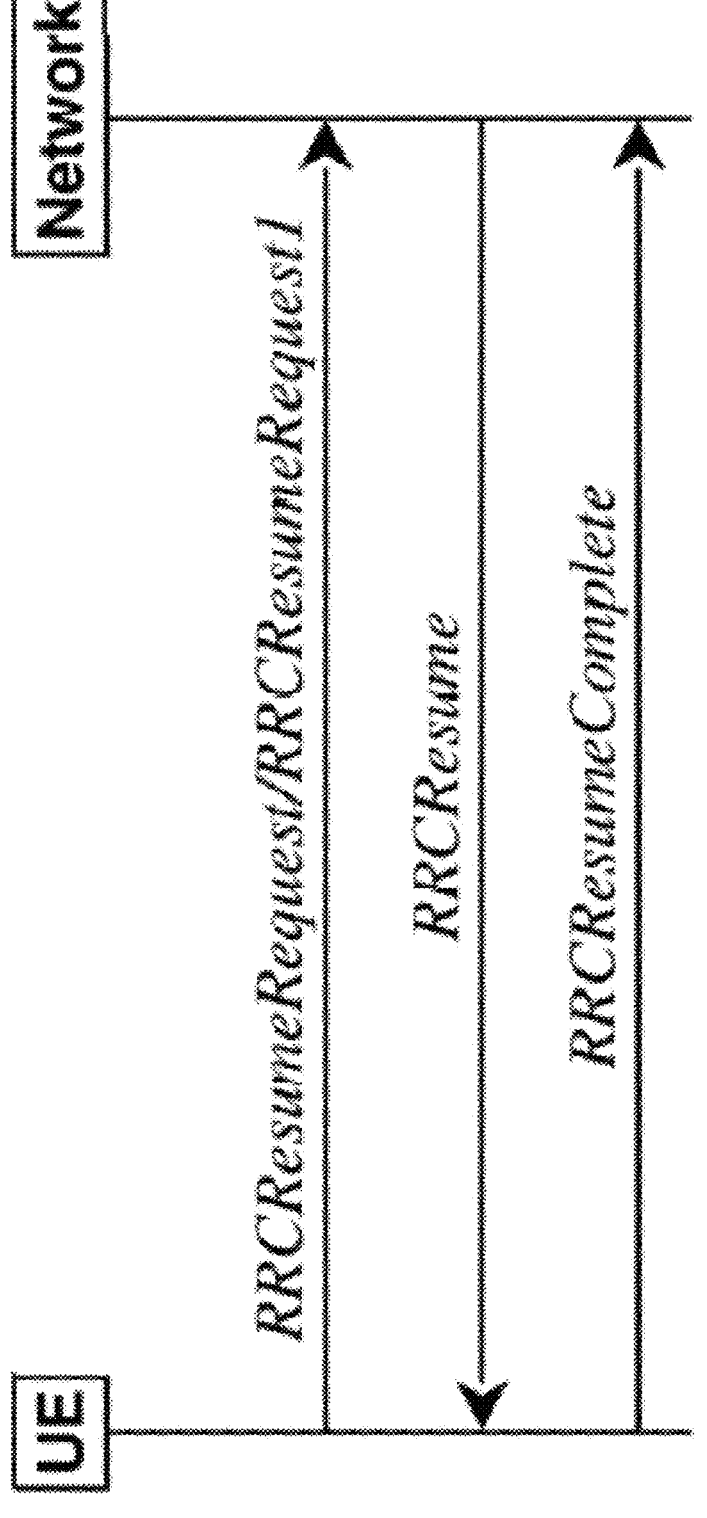
FIG. 17 shows an example RRC connection resume with successful operation according to some aspects of some of various exemplary embodiments of the present disclosure.
Figure 18:
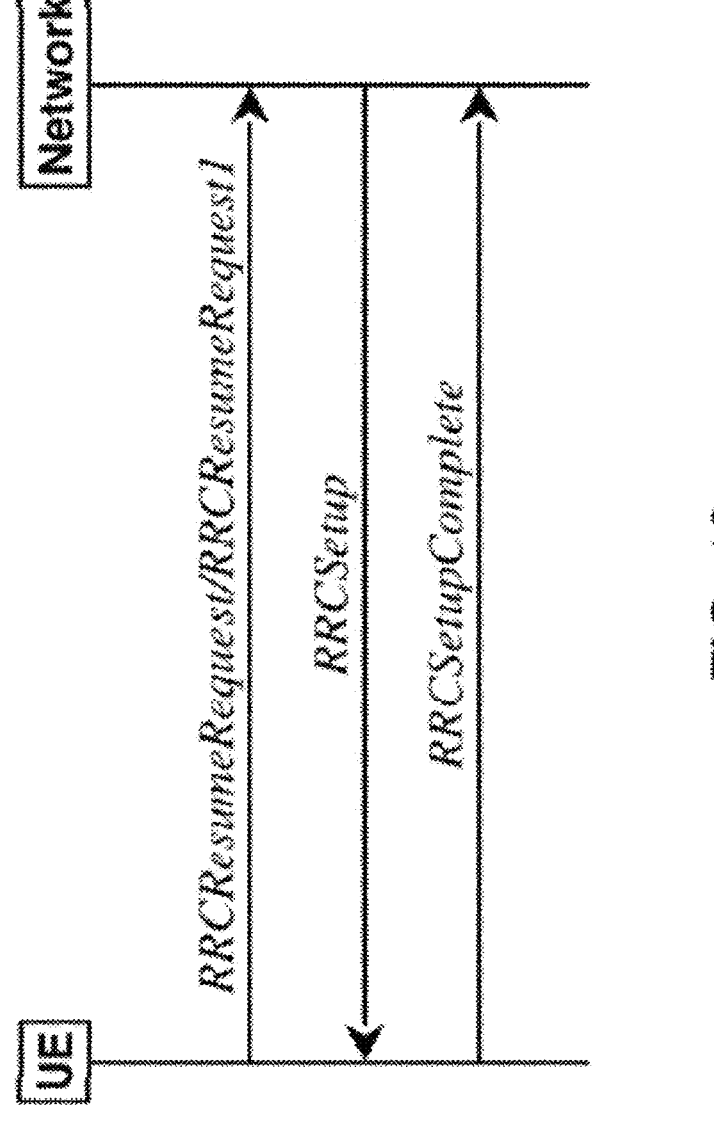
FIG. 18 shows an example RRC connection resume fallback to RRC connection establishment with successful operation according to some aspects of some of various exemplary embodiments of the present disclosure.
Figure 19:
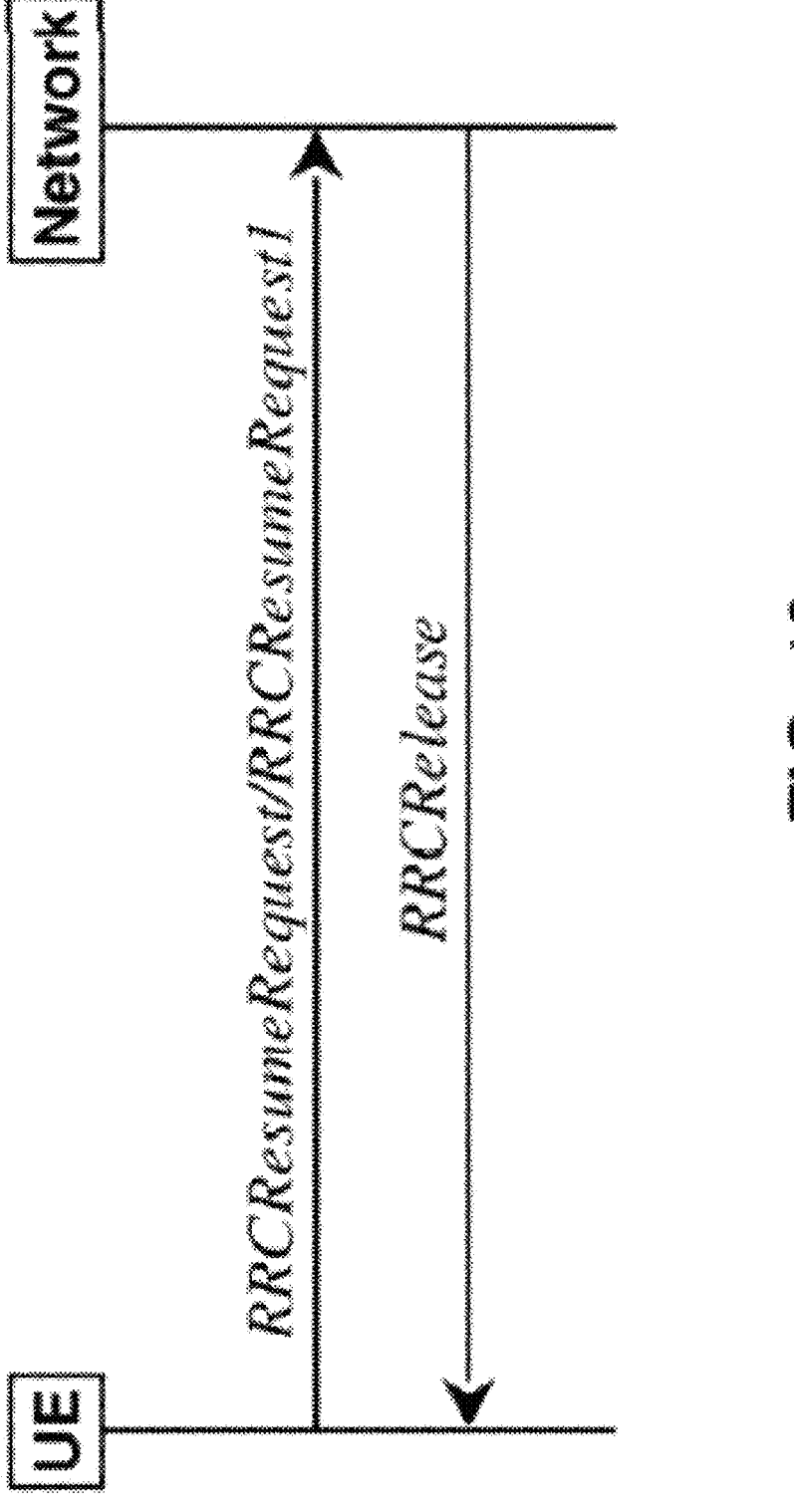
FIG. 19 shows an example RRC connection resume followed by network release with successful operation according to some aspects of some of various exemplary embodiments of the present disclosure.
Figure 20:
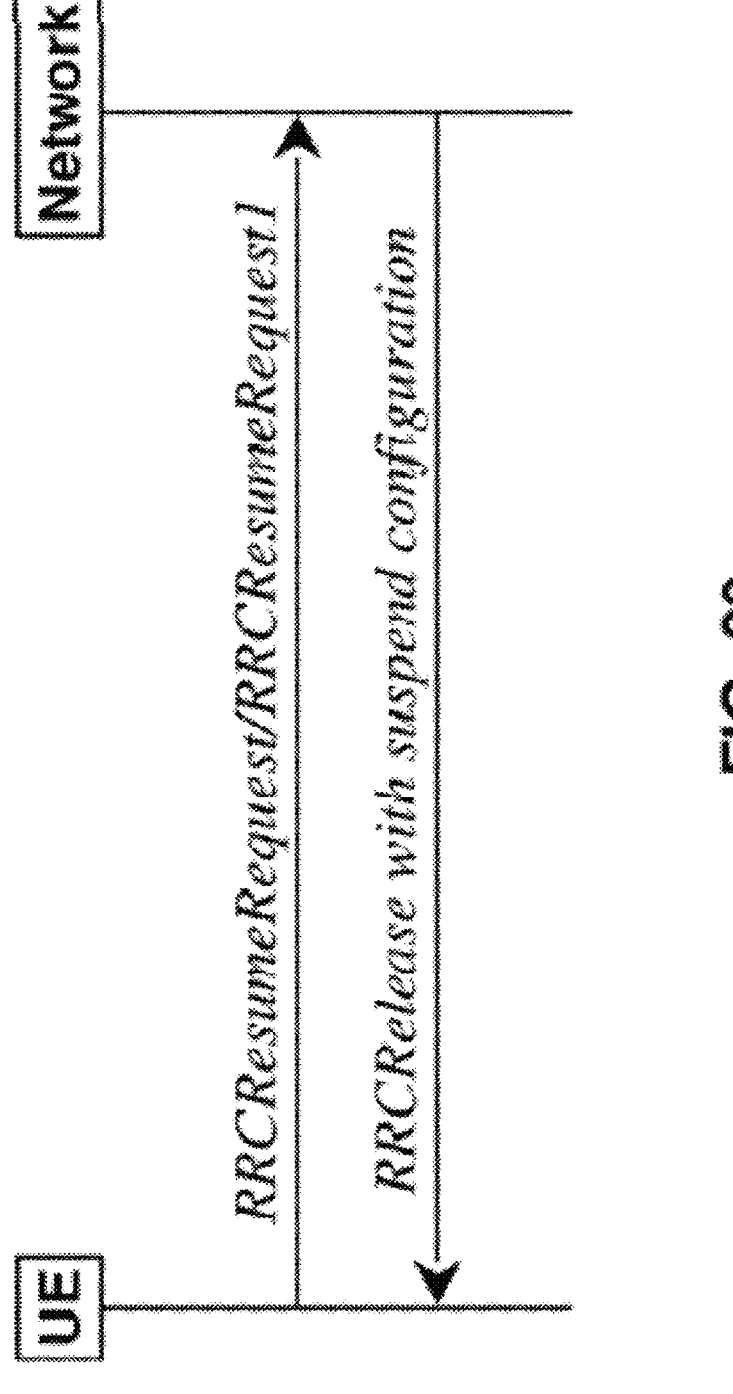
FIG. 20 shows an example RRC connection resume followed by network suspend with successful operation according to some aspects of some of various exemplary embodiments of the present disclosure.
Figure 21:
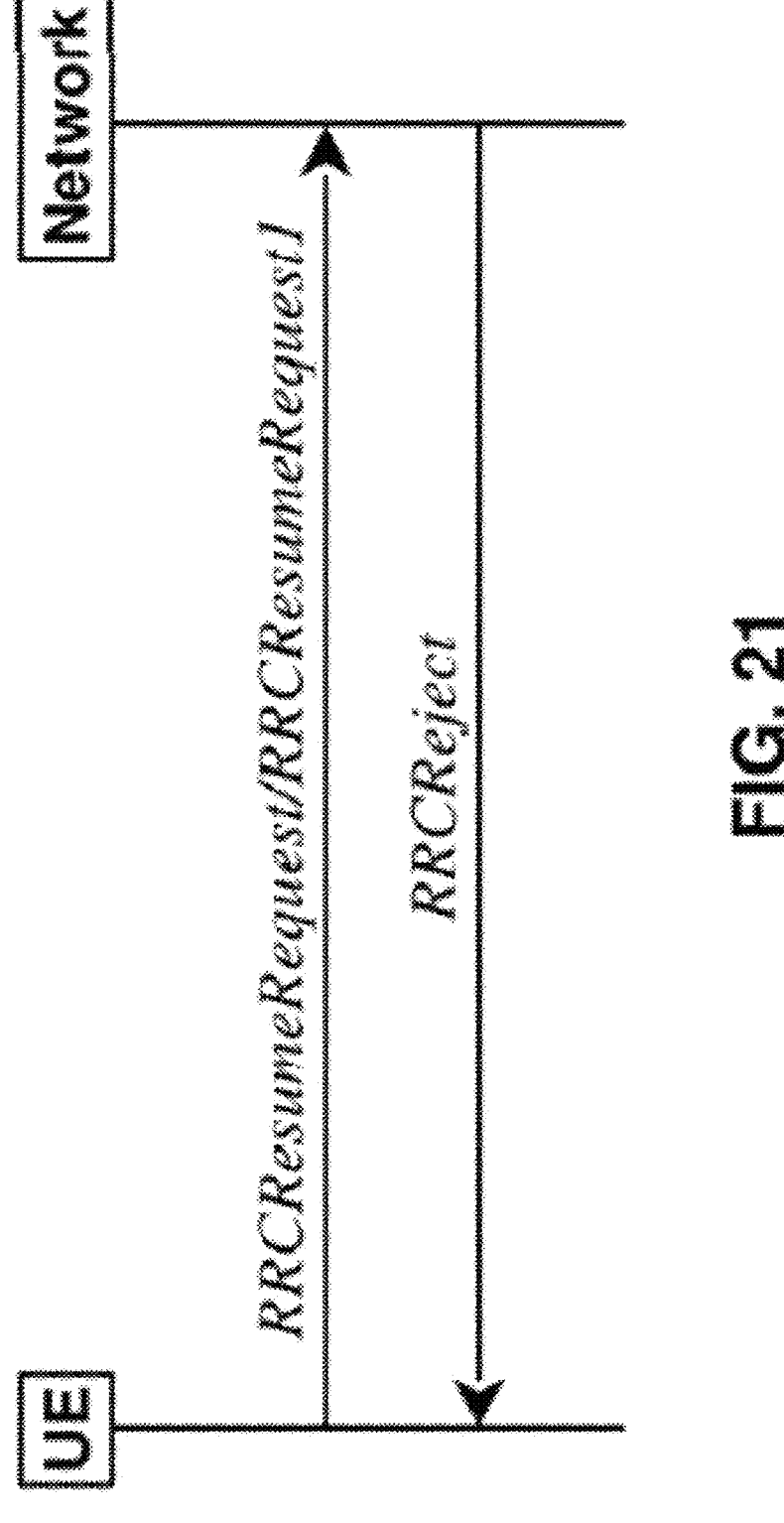
FIG. 21 shows an example RRC connection resume with network reject according to some aspects of some of various exemplary embodiments of the present disclosure.

The UE may ensure having valid and up to date essential system information before initiating this procedure. An example RRC connection resume with successful operation is shown in FIG. 17. An example RRC connection resume fallback to RRC connection establishment with successful operation is shown in FIG. 18. An example RRC connection resume followed by network release with successful operation is shown in FIG. 19. An example RRC connection resume followed by network suspend with successful operation is shown in FIG. 20. An example RRC connection resume with network reject is shown in FIG. 21.

In some examples, an RRCResume message may be used to resume the suspended RRC connection. The RRCResume message may illustratively including information utilized in accordance with one or more aspects of the present application. A field/IE masterCellGroup may be used for configuration of the master cell group. A field/IE radioBearer-Config may be used for configuration of Radio Bearers (DRBs, SRBs) including SDAP/PDCP. A field/IE radio-BearerConfig2 may be used for configuration of Radio Bearers (DRBs, SRBs) including SDAP/PDCP. This field may be used if the UE supports NR-DC or NE-DC. A field/IE restoreMCG-SCells may indicate that the UE may restore the MCG SCells from the UE Inactive AS Context, if stored. A field/IE restoreSCG may indicate that the UE may restore the SCG configurations from the UE Inactive AS Context, if stored.

In some examples, an RRCResumeComplete message may be used to confirm the successful completion of an RRC connection resumption.

In some examples, an RRCResumeRequest message may be used to request the resumption of a suspended RRC connection or perform an RNA update. A field/IE resume-Cause may provide the resume cause for the RRC connection resume request as provided by the upper layers or RRC. The network may not be expected to reject an RRCResum-eRequest due to unknown cause value being used by the UE. A field/IE resumeIdentity may indicate a UE identity to facilitate UE context retrieval at gNB. A field/IE resume-MAC-I may indicate an authentication token to facilitate UE authentication at gNB. The 16 least significant bits of the MAC-I may be calculated using the AS security configuration.

In some examples, an RRCResumeRequest1 message may be used to request the resumption of a suspended RRC connection or perform an RNA update. A field/IE resume-Cause may provide the resume cause for the RRCResumeRequest1 as provided by the upper layers or RRC. A gNB may not be expected to reject an RRCResumeRequest1 due to unknown cause value being used by the UE. A field/IE resumeIdentity may indicate a UE identity to facilitate UE context retrieval at gNB. A field/IE resumeMAC-I may indicate an authentication token to facilitate UE authentication at gNB. The 16 least significant bits of the MAC-I may be calculated using the AS security configuration.

In some examples, an RRCSetup message may be used to establish SRB1. A field/IE masterCellGroup may be used by the network to configure only the RLC bearer for the SRB1, mac-CellGroupConfig, physicalCellGroupConfig and spCellConfig. A field/IE radioBearerConfig and SRB1 may be configured in RRC setup.

In some examples, an RRCSetupRequest message may be used to request the establishment of an RRC connection. A field/IE establishmentCause may provide the establishment cause for the RRCSetupRequest in accordance with the information received from upper layers. gNB may not be expected to reject an RRCSetupRequest due to unknown cause value being used by the UE. A field/IE ue-Identity may indicate a UE identity included to facilitate contention resolution by lower layers.

Example embodiments may enable quality of experience (QoE) measurement collection for different services including streaming services. Example QoE management may collect the experience parameters of streaming services as well as augmented reality/virtual reality (AR/VR) and URLLC.

In some example embodiments, QoE measurement may enable collecting the user KPI information, e.g., end-to-end (E2E) reliability statistic indicator, etc.

In some examples, different types of UEs may have different QoE requirements. In some examples, QoE parameters may be defined as UE-specific, and service related. In some examples, QoE may be used as criteria to evaluate network quality. In the past, QoE metrics related to throughput, capacity and coverage for performance evaluations for network solutions. Example embodiments may enable mechanisms of trigger, configuration and reporting for QoE measurement collection, including relevant entities (e.g., UE, network entities).

In some examples, signaling-based and management-based mechanisms may be used for QoE related signaling. In some examples, application layer measurement configuration received from OAM or CN may be encapsulated in a transparent container, which may be forwarded to UE in a downlink RRC message. Application layer measurements received from UE's higher layer may be encapsulated in a transparent container and sent to network in an uplink RRC message.

In some examples, RAN may release an ongoing QoE measurements/reporting configuration, e.g., if handing over to a network that does not support this.

In some examples, an area may be defined and/or configured for QoE measurement and/or reporting. In some examples, for the Area Handling the network may keep track of whether the UE is inside or outside the area and may configure/release configuration accordingly. In some examples, the network may keep track of whether the UE is inside or outside the area, and the UE may manage start stop of QoE accordingly. In some examples, the UE may perform area checking (UE may have the area configuration) and to manage start stop of QoE accordingly.

In some examples, QoE measurements in RRC INACTIVE state may be supported, for MBS. In some examples, QoE measurements in RRC IDLE state may be supported, for MBS.

In some examples, management-based QoE configuration may not override signaling based QoE configuration.

In some examples, QoE reports may be sent via a separate SRB (separate from current SRBs) in NR, as this reporting may be lower priority than other SRB transmissions.

In some examples, configuration and reporting for multiple simultaneous QoE measurements for a UE may be supported.

In some examples, RRC signaling may be used by the gNB to indicate the UE to pause or resume the QoE reporting.

In some examples, the pause/resume may be for all QoE reports or may be per QoE configuration.

In some examples, QoE measurements may be configured in an RRCReconfiguration message.

In some examples, configuration of QoE measurements may be in a OtherConfig information element in an RRCReconfiguration message.

In some examples, the configuration of QoE measurements may be by means of a list (e.g., an RRC list parameter) to enable configuration of multiple simultaneous measurements.

In some examples, for RRC an ID may be used to identify a measurement. In some examples, this ID may be the QoE reference ID.

In some examples, SRB4 may be used for transmission of QoE reports in NR.

In some examples, an RRC message MeasReportAppLayer may be used for the transmission of QoE reports in NR.

In some examples, QoE support for NR may include:
activation by Trace Function, both signaling and
management-based configuration and RRC procedures
supporting AppLayer config and report.

In some examples, the UE may follow gNB commands and, NG-RAN may release by RRC the application layer measurement configuration towards the UE at any time, e.g., if required due to load or other reasons.

In some examples, the UE Inactive access stratum (AS) context may include the UE AS configuration for the QoE (for examples, it may not be released when UE goes to Inactive).

In some examples, "QoE pause" indication from the network may be used to temporarily stop QoE reports from being sent from the UE to the network.

In some examples, for QoE report handling during RAN overload via "QoE report pause indication": application layer may be responsible for storing QoE reports when the UE receives QoE pause indication.

In some examples, for QoE report handling during RAN overload via "QoE report pause indication": AS layer may be responsible for storing QoE reports when the UE receives QoE pause indication.

In some examples, for QoE report handling during RAN overload via "QoE report pause indication": the QoE container received from application layer may be discarded during pause.

In some examples, application layer measurement collection function may enable collection of application layer measurements from the UE. Example supported service types may be QoE measurement collection for services such as streaming services, etc. Both signaling based and management-based initiation cases may be used. For the signaling-based case, the Application Layer Measurement Collection may be initiated towards a specific UE from CN nodes; for the management-based case, the Application Layer Measurement Collection may be initiated from OAM targeting an area (e.g., without targeting a specific UE).

Application layer measurement configuration received from OAM or CN may be encapsulated in a transparent container, which may be forwarded to UE in a downlink RRC message. Application layer measurements received from UE's higher layer may be encapsulated in a transparent container and sent to network in an uplink RRC message. The network may release the application layer measurement configuration towards the UE at any time.

In some examples, for URLLC service, E2E delay may be critical, and operators may monitor and guarantee the delay measurement.

In some examples, the QoE management framework may exist in two flavors: Signaling-based QoE, and Management-based QoE. In the signaling based QoE, the QoE measurement configuration (QMC) may be delivered to the PAN node. The QMC may specify the area scope for the measurement, where the area scope may be defined via a list or cells/TAs/TAIs/PLMNs. In the Management-based QoE, the OAM may deliver the QMC to the PAN node.

In some examples, a threshold-based mechanism to trigger the start and stop of QoE measurement collection may be used. In some examples, a time-based event may be used for activation of QoE measurement to enable the flexibility of QoE measurement activation within a certain period of predefined time.

In some examples, upon receiving a "pause" indication from the network, the UE may stop QoE reporting, but may continue QoE measurements.

In some examples, "QoE pause" indication from the network may be used to temporarily stop QoE reports from being sent to the network, but it may not affect the QoE measurements collection at the UE. For example, the UE may continue ongoing QoE measurements and may trigger new ones at the application layer (e.g., as per QoE configurations stored at the UE).

In some examples, in case of overload in RAN, the base station may temporarily stop the reporting from the UE by sending an RRC message (e.g., an RRCConnectionReconfiguration message) to relevant UEs. The RRCConnectionReconfiguration message may include measConfigAppLayer set to temporarily stop application layer measurement reporting in otherConfig. In some examples, the Access stratum may send a command to the application with the temporary stop request. The application may stop the reporting and may stop recording further information when the data in the reporting container is used. Then the recorded data may be kept until it is reported or when the UE request session is ended.

In some examples, when the overload situation in RAN is ended the base station may restart the reporting from the UE by sending an RRC message (e.g., the RRCConnectionReconfiguration message) to relevant UEs. The RRCConnectionReconfiguration message may include measConfigAppLayer set to restart application layer measurement reporting in otherConfig. The Access stratum may send a command to the application with the restart request. The application may restart the reporting and recording if it was stopped.

In some examples, RAN may release an existing QoE measurement configuration when the session for which the QoE measurements are reported is completed or when the UE is handing over to a network that does not support the QoE measurement. An NG-RAN node may issue a release of QoE measurement configuration for UEs previously configured for QoE measurement reporting, provided that the session for which the QoE measurements are reported is completed. In some examples, RAN may need to release an ongoing QoE measurement configuration or QoE reporting configuration, e.g., if handing over to a network that does not support this.

In some examples, RAN may release existing QoE measurement configuration in case of RAN overload. In some examples, in case of RAN overload in standalone connectivity, RAN may stop new QoE measurement configurations, release existing QoE measurement configurations and pause QoE measurement reporting. In some examples, RRC signaling may be used by the gNB to indicate the UE to pause or resume the QoE reporting. In some examples, pause/resume may be for all QoE reports or pause/resume may be per QoE configuration. In some examples, the UE may store the reports (e.g., for a predetermined or configurable time period). In some examples, there may be a limit for stored reports size.

In some examples, RAN may be allowed to release a QoE configuration from a UE at any time including the time when the related QoE measurement session is ongoing. In some examples, when RAN orders the UE to release a QoE configuration, a UE may release the QoE configuration and may stop reporting for this QoE configuration (including any available and non-sent reports).

In some examples, RAN may stop new QoE measurement configurations, release existing QoE measurement configurations and pause QoE measurement reporting in the case of RAN overload. In some examples, in case the UE is configured with multiple QoE configurations, the network may pause reporting for only some of the configurations. In some examples, in order to temporarily pause QoE reporting from a UE, e.g., during RAN overload, RAN may send the QoE reporting pause command to the UE (e.g., using a MAC CE or in the DL RRC message), which may indicate QoE configurations (one or more) for which the reporting to be paused. In some examples, when the UE pauses the QoE report, the UE may continue the measurement collection. The UE may continue to generate the QoE measurement results.

In some examples, pause and resume commands for a QoE configuration may be forwarded by the UE to application layer. After receiving a pause indication from the UE, application layer may stop sending reports to RRC layer and may continue to do so after receiving resume indication from the UE.

In some examples, network-controlled mobility may apply to UEs in RRC_CONNECTED and may be categorized into two types of mobility: cell level mobility and beam level mobility.

In some examples, a gNB may release a list of QoE measurement configurations in one RRCReconfiguration message. In some examples, if a QoE measurement configuration is released, RRC layer may inform the upper layer to release the QoE measurement configuration. In some examples, if the UE enters IDLE state, UE may release all of the QoE measurement configurations. In some examples, QoE configuration and report may be encapsulated in a transparent container in the RRC messages. In some examples, at lease service type and RRC level ID (Reference ID or shorten ID) together with corresponding QMC configuration container may be included for each QoE configuration in RRCReconfiguration message when the network setups QoE measurement to the UE. In some examples, at least RRC level ID (Reference ID or shorten ID) together with corresponding QMC report container may be included in MeasReportAppLayer message for a QoE report. In some examples, QoE configuration modification may not need to be supported from RAN2 signaling point of view (in RRC). In some examples, multiple QoE measurement configurations may be configured for a certain service type. In some examples, the maximum container size of 1000 bytes for QoE measurements configuration may be used.

In some examples, at reception of QoE release, the UE may discard any unsent QoE reports corresponding to the released QoE configuration. In some examples, a pause resume process may affect all configurations. In some examples a pause resume process may act selectively per configuration.

In some examples, the QoE Reference may not need to be sent to or from the UE in RRC signaling for QoE measurements in RRC_CONNECTED. In some examples, the RRC ID, MeasConfigAppLayerId, may be sufficient to identify the QoE configuration between UE and gNB. In some examples, gNB may keep the mapping between MeasConfigAppLayerId and QoE Reference. The mapping may be sent to the target gNB as part of QoE configuration and information at handover. In some examples, the RRC layer may forward the MeasConfigAppLayerId together with the QoE configuration to the application layer. In some examples, maximum number of QoE configurations per UE may be eight. In some examples, when the UE resumes the connection in a gNB supporting QoE, the target gNB may explicitly indicate which QoE measurement configurations should be kept by the UE during RRC resume procedure, e.g., in RRCResume message. The UE may release QoE measurement configurations not indicated by the gNB for restoration. In some examples, during the handover to target gNB which supports QoE, the target gNB may decide which QoE configurations to keep and which to release during a handover, e.g., based on QoE configuration information received from the source gNB in Xn/Ng signaling including the RRC container. In some examples, the UE may discard the reports received from application layer in case it has no associated QoE configuration configured. In some examples, the gNB may need to know the QoE configurations for which there are ongoing QoE sessions, e.g., to enable QoE configuration handling upon mobility. In some examples in case the UE resumes the connection in a gNB not supporting QoE, the UE may release all QoE measurement configurations.

Quality of Experience (QoE) measurement and reporting is an important functionality for various services and applications including streaming, virtual/augmented reality (VR/AR) and URLLC applications. A UE in an RRC inactive state may store UE context including QoE configuration parameters associated with one or more QoE configuration. In response to an RRC resume procedure, the existing UE context restoration processes may lead to inefficiencies in QoE measurement and/or reporting. Example embodiments may enhance the QoE measurement/reporting in response to an RRC resume procedure.

In example embodiments, a UE may have an RRC connection with a first gNB (i.e., the UE may be in an RRC connected state). The UE may receive one or more RRC messages comprising configuration parameters from the first gNB. In some examples, the one or more RRC messages may comprise an RRC reconfiguration message. For examples, the configuration parameters may comprise configuration parameters of one or more cells. In some examples, the configuration parameters may comprise configuration parameters of one or more cells provided by the first gNB. In some examples and in case of dual connectivity, the configuration parameters may comprise configuration parameters of one or more cells provided by the first gNB (as a master gNB) and a secondary gNB. The configuration parameters may further comprise QoE configuration parameters to be used by the UE for QoE measurement and/or QoE reporting. The UE may utilize the QoE configuration parameters to perform QoE measurement and QoE reporting while in the RRC connected state.

Figure 22:
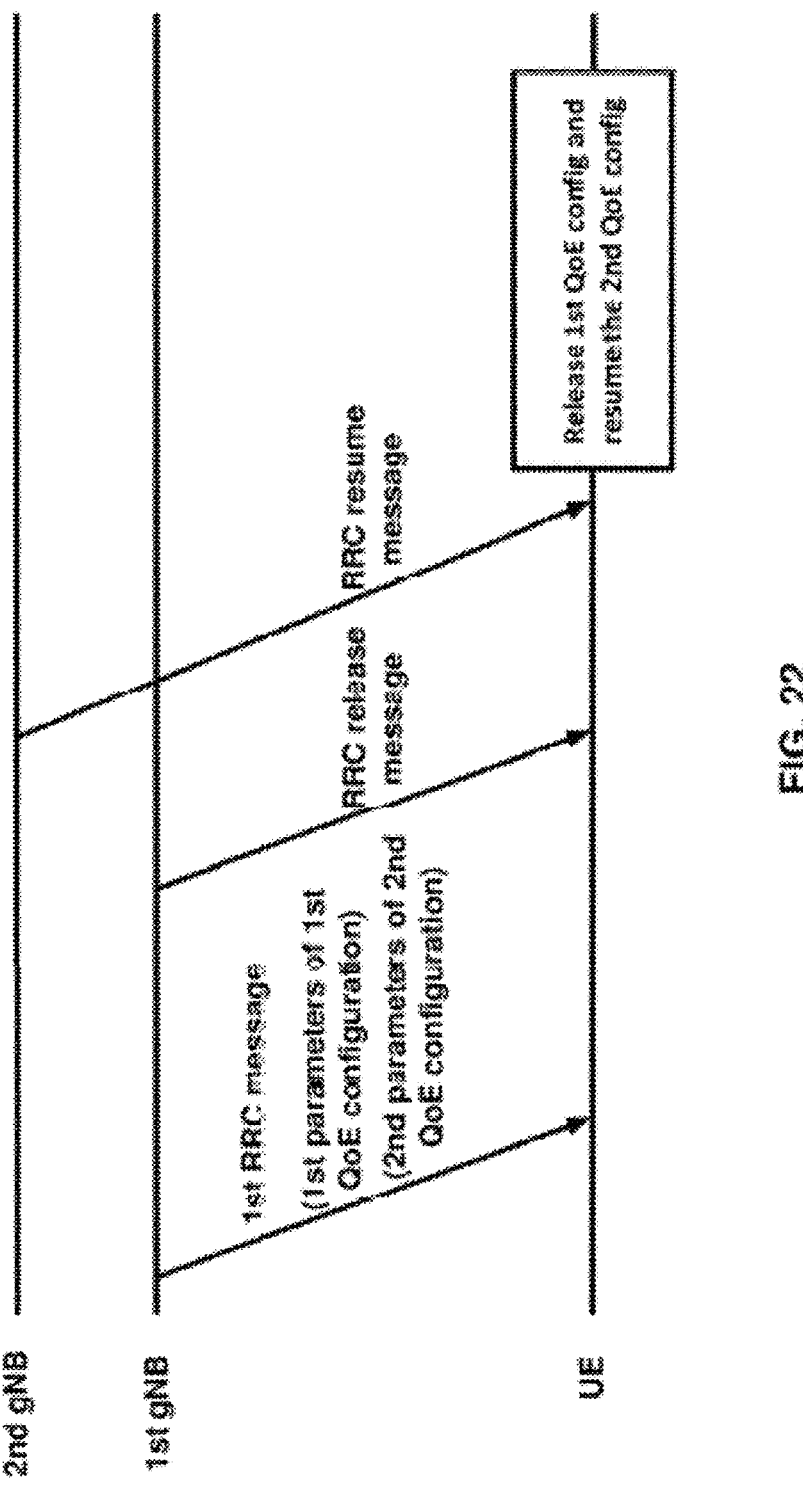
FIG. 22 shows an example process according to some aspects of some of various exemplary embodiments of the present disclosure.

In an example embodiment as shown in FIG. 22, the QoE configuration parameters may be associated with a plurality of QoE configurations comprising a first QoE configuration and a second QoE configuration. The QoE configuration parameters may comprise first configuration parameters of the first QoE configuration and second configuration parameters of the second QoE configuration. The UE may receive an RRC release message. The RRC release message may indicate transitioning of the UE from the RRC connected state to an RRC inactive state. The RRC release message comprise a suspend config IE indicating the transitioning of the UE from the RRC connected state to the RRC inactive state. The suspend config IE may comprise a plurality of parameters for UE operation during the RRC inactive state. The plurality of parameters may comprise parameter(s) indicating one or more RNTIs, a parameter indicating a RAN paging cycle, a parameter indicating a RAN notification area, one or more timer values, etc. The UE may transition from the RRC connected state to the RRC inactive state in response to receiving the RRC release message.

The UE may receive an RRC resume message from a second gNB. For example, the UE may move from coverage area of the first gNB to the coverage area of the second gNB. The RRC resume message may indicate transitioning of the UE from the RRC inactive state to the RRC connected state. The RRC resume message may indicate restoring/resuming a suspended RRC connection, e.g., at least a portion of the UE context. In some examples, the receiving of the RRC resume message may be in response to transmission of an RRC resume request message by the UE to the second gNB. In response to receiving the RRC resume message, the UE may release the first QoE configuration and may resume the second configuration parameters of the second QoE configuration. The second gNB may support QoE measurement and/or reporting associated with the second QoE configuration and may not support QoE measurement and/or reporting associated with the first QoE configuration. In some examples, the releasing of the first QoE configuration and resuming of the second QoE configuration may be dependent, or based, at least in part, on the second gNB supporting QoE measurement/reporting associated with the second QoE configuration. The releasing of the first QoE may be further dependent, or based, on the UE not supporting QoE measurement/reporting associated with the first QoE configuration.

In some examples, the UE may discard one or more first measurement reports associated with the first QoE configuration. The UE may discard the one or more first measurement reports based on the first QoE configuration not being supported by the second gNB.

In some examples, the second gNB may transmit an indication to the UE that the second gNB supports QoE measurement/reporting associated with the second QoE configuration and/or that the second gNB does not support QoE measurement/reporting associated with the first QoE configuration. In some examples, the indication may be provided via the RRC resume message. For example, the RRC resume message may comprise one or more information elements (e.g., information) specifying or indicating that the second gNB supports QoE measurement/reporting associated with the second QoE configuration and that the second gNB does not support QoE measurement/reporting associated with the first QoE configuration. In some examples, the information may be received via system information (e.g., received via one or more broadcast messages). In some examples, the indication may be received via a system information block (SIB, e.g., a QoE-related SIB). The SIB (e.g., the QoE-related SIB) may include information indicating that the second gNB supports QoE measurement/reporting associated with the second QoE configuration and that the second gNB does not support QoE measurement/reporting associated with the first QoE configuration.

In some examples, the information may be based on a bitmap. The bitmap may comprise a plurality of bits comprising a first bit, associated with the first QoE configuration, and a second bit associated with the second QoE configuration. In some examples, the indication may be based on association of QoE configuration identifier(s) with values indicating whether the second gNB supports or does not support the corresponding QoE configuration(s). The specific values of the bits and the interpreted meaning associated with specific values (e.g., whether or not QoE configurations are supported) can vary in terms of positively supported, negatively supported, or a combination thereof.

In some examples, while in the RRC connected state (e.g., before receiving the RRC release message), the UE may perform QoE measurement and QoE report for both of the first QoE configuration and the second QoE configuration. In response to receiving the RRC resume message and based on the second gNB not supporting QoE measurement/reporting corresponding to the second QoE configuration, the UE may perform QoE measurement and QoE report for the second QoE configuration and not the first QoE configuration. The UE may report a QoE measurement report (e.g., may transmit a measurement report) based on one or more RRC messages. The one or more RRC messages used for transmission of a QoE report may be associated with a signaling radio bearer (SRB), e.g., a QoE-related SRB, e.g., SRB4. In some examples, the QoE-related SRB (e.g., SRB4) may have a priority that is lower than a second SRB associated with an uplink common control channel logical channel. The one or more RRC messages used for transmission of a QoE report may comprise a measurement report application layer IE that includes the QoE report. In some examples, the QoE report may comprise a QoE identifier associated with the QoE configuration.

Figure 23:
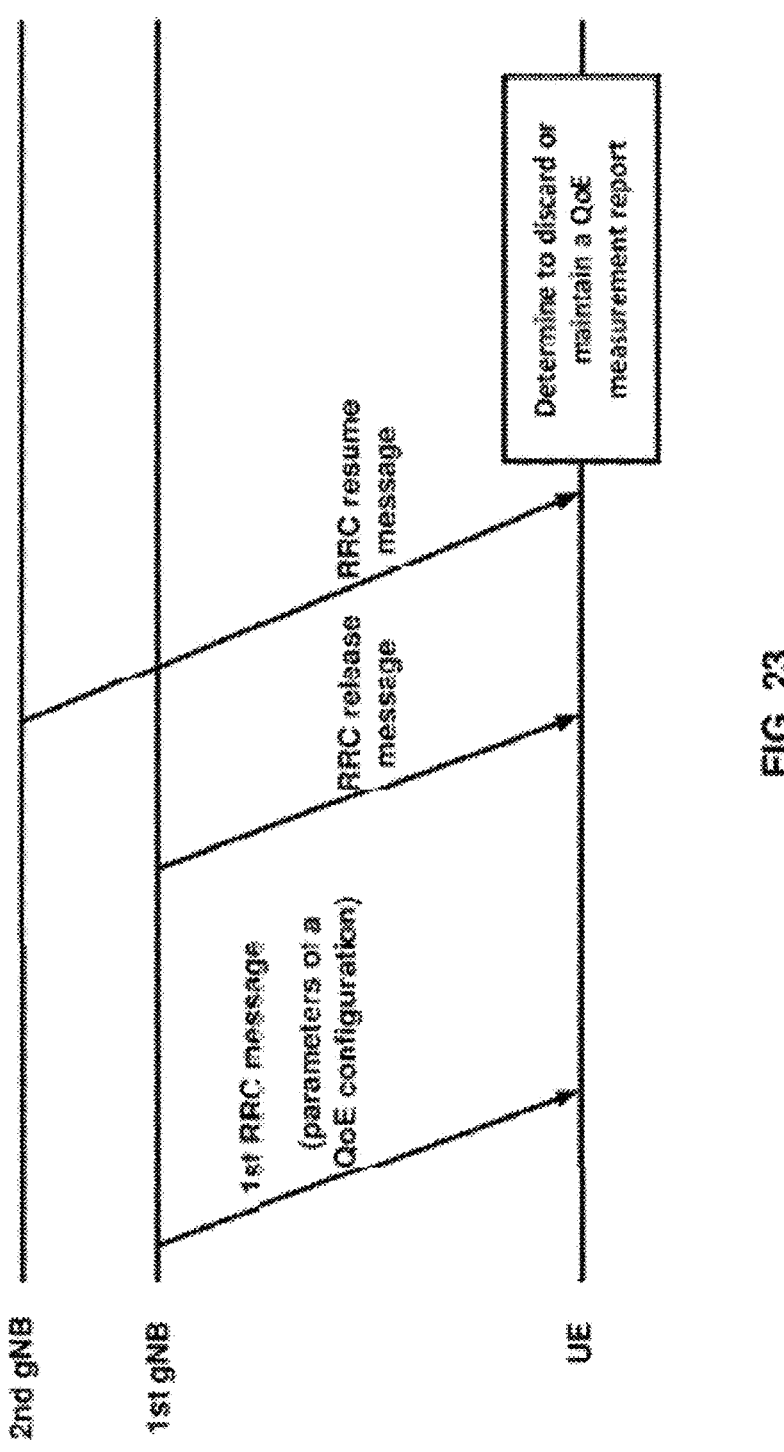
FIG. 23 shows an example process according to some aspects of some of various exemplary embodiments of the present disclosure.

In an example embodiment as shown in FIG. 23, the QoE configuration parameters may be associated with a of QoE configuration. The UE may receive an RRC release message. The RRC release message may indicate transitioning of the UE from the RRC connected state to an RRC inactive state. The RRC release message comprise a suspend config 1E indicating the transitioning of the UE from the RRC connected state to the RRC inactive state. The suspend config IE may comprise a plurality of parameters for UE operation during the RRC inactive state. The plurality of parameters may comprise parameter(s) indicating one or more RNTIs, a parameter indicating a RAN paging cycle, a parameter indicating a RAN notification area, one or more timer values, etc. The UE may transition from the RRC connected state to the RRC inactive state in response to receiving the RRC release message.

The UE may receive an RRC resume message from a second gNB. For example, the UE may move from coverage area of the first gNB to the coverage area of the second gNB. The RRC resume message may indicate transitioning of the UE from the RRC inactive state to the RRC connected state. The RRC resume message may indicate restoring/resuming a suspended RRC connection, e.g., at least a portion of the UE context. In some examples, the receiving of the RRC resume message may be in response to transmission of an RRC resume request message by the UE to the second gNB. The RRC resume message may indicate that at least one first QoE configuration parameter, of the QoE configuration parameters, is updated. The UE may determine to discard or maintain a QoE measurement report based on the at least one first configuration parameter (e.g., based on type(s) of the at least one first configuration parameter) that is updated in response to the RRC resume message. In response to a determination to discard the QoE measurement report, the UE may discard the measurement report. In response to a determination to maintain the QoE measurement report, the UE may maintain the QoE measurement report.

In some examples, while in the RRC connected state (e.g., before receiving the RRC release message), the UE may perform QoE measurement and QoE report associated with the QoE configuration. In response to receiving the RRC resume message, the UE may perform QoE measurement and/or reporting. The UE may report a QoE measurement report (e.g., may transmit a measurement report) based on one or more RRC messages. The one or more RRC messages used for transmission of a QoE report may be associated with a signaling radio bearer (SRB), e.g., a QoE-related SRB, e.g., SRB4. In some examples, the QoE-related SRB (e.g., SRB4) may have a priority that is lower than a second SRB associated with an uplink common control channel logical channel. The one or more RRC messages used for transmission of a QoE report may comprise a measurement report application layer IE that includes the QoE report. In some examples, the QoE report may comprise a QoE identifier associated with the QoE configuration.

In an example embodiment, an apparatus, illustratively such as a user equipment (UE), may receive, from a first base station (BS), a first radio resource control (RRC) message comprising first configuration parameters of a first QoE configuration and second configuration parameters of a second QoE configuration. The UE may receive an RRC release message indicating transitioning of the UE from an RRC connected state to an RRC inactive state. The UE may receive, from a second BS, an RRC resume message indicating transitioning of the UE from the RRC inactive state to the RRC connected state. In response to receiving the RRC resume message, the UE may release the first QoE configuration and resume the second QoE configuration.

In some examples, the second base station (BS) may: support the second quality of experience (QoE) configuration; and may not support the first QoE configuration.

In some examples, the releasing the first QoE configuration and resuming the second QoE configuration may be based on the second base station (BS): supporting the second QoE configuration; and not supporting the first QoE configuration.

In some examples, the UE may receive an indication from the second base station (BS) that the second base station (BS): supports the second quality of experience (QoE) configuration; and does not support the first QoE configuration. In some examples, the indication may be based on a bitmap comprising a plurality of bits. A first bit, in the plurality of bits, may be associated with the first quality of experience (QoE) configuration. A second bit, in the plurality of bits, may be associated with the second QoE configuration. A first value of the first bit may indicate that the second base station (BS) does not support the first QoE configuration. A second value of the second bit may indicate that the second BS supports the second QoE configuration. In some examples, the indication may be based on at least one of a first identifier of the first quality of experience (QoE) configuration and a second identifier of the second QoE configuration. In some examples, the indication may be based on the radio resource control (RRC) resume message. In some examples, the radio resource control (RRC) resume message may comprise one or more information elements (IEs) indicating that the second base station (BS): supports the second quality of experience (QoE) configuration; and does not support the first QoE configuration. In some examples, the UE may receive system information, wherein the indication may be based on the system information. In some examples, one or more values of one or more fields of the system information may indicate that the second base station (BS): supports the second quality of experience (QoE) configuration; and does not support the first QoE configuration. In some examples, a first system information block (SIB) may comprise the system information. In some examples, the first SIB may be a quality of experience (QoE)-related SIB.

In some examples, the first radio resource control (RRC) message may be an RRC reconfiguration message.

In some examples, the radio resource control (RRC) release message may comprise a suspend config information element (IE) indicating transitioning of the user equipment (UE) from the RRC connected state to the RRC inactive state. In some examples, the suspend config information element (IE) may comprise at least one of: one or more radio network temporary identifiers (RNTIs); a first parameter indicating a radio access network (RAN) paging cycle; a second parameter indicating a RAN notification area; and one or more timer values.

In some examples, the radio resource control (RRC) resume message may indicate restoring one or more configuration parameters for the user equipment (UE) after transitioning to the RRC connected state.

In some examples, the UE may discard one or more first measurement reports associated with the first quality of experience (QoE) configuration in response to receiving the radio resource control (RRC) resume message. In some examples, the discarding the one or more first quality of experience (QoE) measurement reports may be based on the second base station (BS) not supporting the first QoE configuration.

In some examples, the UE may perform, while in the radio resource control (RRC) inactive state and in response to receiving the RRC release message, at least one of a quality of experience (QoE) measurement and a QoE measurement reporting associated with the first QoE configuration and the second configuration. The UE may perform, in response to receiving the RRC resume message, QoE measurement and QoE measurement reporting associated with the second QoE configuration. In some examples, the quality of experience (QoE) measurement reporting may be via one or more radio resource control (RRC) messages. In some examples, a quality of experience (QoE) measurement report may be associated with a QoE-related signaling radio bearer (SRB). In some examples, the quality of experience (QoE)-related signaling radio bearer (SRB) may be SRB4. In some examples, the quality of experience (QoE)-related signaling radio bearer (SRB) may have a priority that is lower than a second SRB associated with an uplink common control channel logical channel. In some examples, the one or more resource control (RRC) messages may comprise a measurement report application layer information element (MeasReportappLayer IE) comprising a QoE measurement report. In some examples, a quality of experience (QoE) measurement report may comprise an identifier associated with a corresponding QoE configuration.

In an example embodiment, a user equipment (UE) may receive, from a first base station (BS), a first radio resource control (RRC) message comprising configuration parameters of a QoE configuration. The UE may receive an RRC release message indicating transitioning of the UE from an RRC connected state to an RRC inactive state. The UE may receive, from a second BS, an RRC resume message indicating transitioning of the UE from the RRC inactive state to the RRC connected state. The UE may determine to discard or maintain a QoE measurement report associated with the QoE configuration in response to the RRC resume message indicating that at least one first configuration parameter of the configuration parameters is updated.

In some examples, the UE may discard the quality of experience (QoE) measurement report based on a determination to discard the QoE measurement report.

In some examples, the UE may maintain the quality of experience (QoE) measurement report based on the determination to maintain the QoE measurement report.

In some examples, the determining to discard or maintain the quality of experience (QoE) measurement report may be based on the at least one first configuration parameter that is updated.

In some examples, the UE may discard the quality of experience (QoE) measurement report irrespective of the type of the at least one first configuration that is updated.

In some examples, the quality of experience (QoE) measurement report may be based on QoE measurement performed during the RRC inactive state.

In some examples, the radio resource control (RRC) release message may comprise a suspend config information element (IE) indicating transitioning of the user equipment (UE) from the RRC connected state to the RRC inactive state. In some examples, the suspend config information element (IE) comprises at least one of: one or more radio network temporary identifiers (RNTIs); a first parameter indicating a radio access network (RAN) paging cycle; a second parameter indicating a RAN notification area; and one or more timer values.

In some examples, the radio resource control (RRC) resume message may indicate restoring one or more configuration parameters for the user equipment (UE) after transitioning to the RRC connected state.

In some examples, the UE may perform, while in the radio resource control (RRC) inactive state and in response to receiving the RRC release message, at least one of a quality of experience (QoE) measurement and a QoE measurement reporting associated with the QoE configuration. In some examples, the quality of experience (QoE) measurement reporting may be via one or more radio resource control (RRC) messages. In some examples, a quality of experience (QoE) measurement report may be associated with a QoE-related signaling radio bearer (SRB). In some examples, the quality of experience (QoE)-related signaling radio bearer (SRB) may be SRB4. In some examples, the quality of experience (QoE)-related signaling radio bearer (SRB) may have a priority that is lower than a second SRB associated with an uplink common control channel logical channel. In some examples, the one or more resource control (RRC) messages may comprise a measurement report application layer information element (MeasReportappLayer IE) comprising a QoE measurement report. In some examples, a quality of experience (QoE) measurement report may comprise an identifier associated with a corresponding QoE configuration.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ended. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of quality of experience (QoE) measurement and reporting, comprising:
  receiving, by a user equipment (UE), a first radio resource control (RRC) message comprising first configuration parameters of a first QoE configuration and second configuration parameters of a second QoE configuration;
  receiving, by the UE, an RRC release message indicating transitioning of the UE from an RRC connected state to an RRC inactive state, wherein the UE is in a connected state when the RRC release message is received;
  receiving, by the UE, from a second BS, an RRC resume message indicating transitioning of the UE from the RRC inactive state to the RRC connected state, wherein the UE is in an inactive state when the RRC resume message is received; and
  in response to receiving the RRC resume message, releasing the first QoE configuration and resuming the second QoE configuration.

Clause 2. The method of Clause 1, wherein the second base station (BS) and supports the second quality of experience (QoE) configuration.

Clause 3. The method of Clause 2, wherein the second BS does not support the first QoE configuration.

Clause 4. The method of Clause 3, wherein releasing the first quality of experience (QoE) configuration and resuming the second QoE configuration occurs where the second base station (BS)supports the second QoE configuration and does not support the first QoE configuration.

Clause 5. The method of Clause 1, further comprising receiving information from the second base station (BS) that the second base station (BS) regarding support of at least one of the first QoE configuration or the second QoE configuration.

Clause 6. The method of Clause 5, wherein the information includes a bitmap comprising a plurality of bits; wherein a first bit, in the plurality of bits, is associated with the first quality of experience (QoE) configuration and wherein a second bit, in the plurality of bits, is associated with the second QoE configuration.

Clause 7. The method of Clause 6, wherein a value of the first bit indicates information indicative of support for the first QoE configuration.

Clause 8. The method of Clause 6 wherein, a value of the second bit indicates support for the second QoE configuration.

Clause 9. The method of Clause 5, wherein the information includes at least one of a first identifiers of the first quality of experience (QoE) configuration and a second identifier of the second QoE configuration.

Clause 10. The method of Clause 5, wherein the information is included in a radio resource control (RRC) resume message.

Clause 11. The method of Clause 5, further comprising receiving system information, and wherein the information is based on the system information.

Clause 12. The method of Clause 9, wherein the system information comprises a first system information block (SIB).

Clause 13. The method of Clause 12, wherein the first SIB is a quality of experience (QoE)-related SIB.

Clause 14. The method of Clause 1, wherein the first radio resource control (RRC) message is a RRC reconfiguration message.

Clause 15. The method of Clause 1, wherein the radio resource control (RRC) release message comprises a suspend config information element (IE) indicating transitioning of the user equipment (UE) from the RRC connected state to the RRC inactive state.

Clause 16. The method of Clause 15, wherein the suspend config information element (IE) comprises at least one of:
  one or more radio network temporary identifiers (RNTIs);
    a first parameter indicating a radio access network (PAN) paging cycle;
    a second parameter indicating a RAN notification area; and one or more timer values.

Clause 17. The method of Clause 1, wherein the radio resource control (RRC) resume message indicates restoring one or more configuration parameters for the user equipment (UE) after transitioning to the RRC connected state.

Clause 18. The method of Clause 1, further comprising discarding one or more first measurement reports associated with the first quality of experience (QoE) configuration in response to receiving the radio resource control (RRC) resume message.

Clause 19. The method of Clause 18, wherein the discarding the one or more first quality of experience (QoE) measurement reports occurs where the second base station (BS) does not support the first QoE configuration.

Clause 20. The method of Clause 1, further comprising:
  performing, while the user equipment (UE) is in the radio resource control (RRC) inactive state, and in response to receiving the RRC release message, at least one of a quality of experience (QoE) measurement;
  reporting the at least one a QoE measurement associated with the first QoE configuration and the second configuration; and
  performing, in response to receiving the RRC resume message, QoE measurement; and
  reporting the QoE measurement reporting associated with the second QoE configuration.

Clause 21. The method of Clause 20, wherein the quality of experience (QoE) measurement reporting is via one or more radio resource control (RRC) messages.

Clause 22. The method of Clause 21, wherein a quality of experience (QoE) measurement report is associated with a QoE-related signaling radio bearer (SRB).

Clause 23. The method of Clause 22, wherein the quality of experience (QoE)-related signaling radio bearer (SRB) is SRB4.

Clause 24. The method of Clause 22, wherein the quality of experience (QoE)-related signaling radio bearer (SRB) has a priority that is lower than a second SRB associated with an uplink common control channel logical channel.

Clause 25. The method of Clause 20, wherein the one or more resource control (RRC) messages comprise a measurement report application layer information element (MeasReportappLayer IE) comprising the QoE measurement report.

Clause 26. The method of Clause 20, wherein the quality of experience (QoE) measurement report comprises an identifier associated with a corresponding QoE configuration.

Clause 27. A method of quality of experience (QoE) measurement and reporting, comprising:
  receiving, by a user equipment (UE) a first radio resource control (RRC) message comprising configuration parameters of a QoE configuration;
  receiving an RRC release message indicating transitioning of the UE from an RRC connected state to an RRC inactive state;
  receiving, by the UE, an RRC resume message indicating transitioning of the UE from the RRC inactive state to the RRC connected state; and
  determining to discard or maintain a QoE measurement report associated with the QoE configuration in response to the RRC resume message indicating that at least one first configuration parameter of the configuration parameters is updated.

Clause 28. The method of Clause 27, further comprising discarding the quality of experience (QoE) measurement report based on the determination to discard the QoE measurement report.

Clause 29. The method of Clause 27, further comprising maintaining the quality of experience (QoE) measurement report based on the determination to maintain the QoE measurement report.

Clause 30. The method of Clause 27, wherein the determination to discard or maintain the quality of experience (QoE) measurement report is based on the at least one first configuration parameter that is updated.

Clause 31. The method of Clause 27, further comprising discarding the quality of experience (QoE) measurement report independent of a type of the at least one first configuration that is updated.

Clause 32. The method of Clause 26, wherein the quality of experience (QoE) measurement report is based on QoE measurement performed during the radio resource control (RRC) inactive state.

Clause 33. The method of Clause 26, wherein the radio resource control (RRC) release message comprises a suspend config information element (IE) indicating transitioning by the user equipment (UE) from the RRC connected state to the RRC inactive state.

Clause 34. The method of Clause 32, wherein the suspend config information element (IE) comprises at least one of:
  one or more radio network temporary identifiers (RNTIs);
  a first parameter indicating a radio access network (PAN) paging cycle;

a second parameter indicating a RAN notification area; and one or more timer values.

Clause 35. The method of Clause 27, wherein the radio resource control (RRC) resume message indicates restoring one or more configuration parameters for the user equipment (UE), after transitioning to the RRC connected state.

Clause 36. The method of Clause 27, further comprising performing, while in the radio resource control (RRC) inactive state, and in response to receiving the RRC release message, at least one of a quality of experience (QoE) measurement and reporting a QoE measurement associated with the QoE configuration.

Clause 37. The method of Clause 36, wherein the quality of experience (QoE) measurement reporting is via one or more radio resource control (RRC) messages.

Clause 38. The method of Clause 37, wherein a quality of experience (QoE) measurement reporting is associated with a QoE-related signaling radio bearer (SRB).

Clause 39. The method of Clause 38, wherein the quality of experience (QoE)-related signaling radio bearer (SRB) is SRB4.

Clause 40. The method of Clause 39, wherein the quality of experience (QoE)-related signaling radio bearer (SRB) has a priority that is lower than a priority of a second SRB associated with an uplink common control channel logical channel.

Clause 41. The method of Clause 37, wherein the one or more radio resource control (RRC) messages comprise a measurement report application layer information element (MeasReportappLayer IE) comprising a quality of experience (QoE) measurement report.

Clause 42. The method of Clause 37, wherein a quality of experience (QoE) measurement report comprises an identifier associated with a corresponding QoE configuration.

Clause 43. An apparatus for utilization in wireless communications comprising:

an antenna for use in transmission of electromagnetic signals;

a memory for maintaining computer-readable code; and a processor for executing the computer-readable code that causes the apparatus to:

receive a first radio resource control (RRC) message comprising first configuration parameters of a first QoE configuration and second configuration parameters of a second QoE configuration;

receive an RRC release message indicating transitioning of the apparatus from an RRC connected state to an RRC inactive state, wherein the apparatus is in a connected state when the RRC release message is received;

receive from a second BS, an RRC resume message indicating transitioning of the apparatus from the RRC inactive state to the RRC connected state, wherein the apparatus is in an inactive state when the RRC resume message is received; and in response to receiving the RRC resume message, release the first QoE configuration and resuming the second QoE configuration.

Clause 44. The apparatus of Clause 43, wherein the second base station (BS) supports the second quality of experience (QoE) configuration.

Clause 45. The apparatus of Clause 44, wherein the second BS does not support the first QoE configuration.

Clause 46. The apparatus of Clause 45, wherein releasing the first quality of experience (QoE) configuration and resuming the second QoE configuration occurs where the second base station (BS) supports the second QoE configuration and does not support the first QoE configuration.

Clause 47. The apparatus of Clause 43, wherein the apparatus is further configured to receive information from the second base station (BS) that the second base station (BS) regarding support of at least one of the first QoE configuration or the second QoE configuration.

Clause 48. The apparatus of Clause 47, wherein the information includes a bitmap comprising a plurality of bits; wherein a first bit, in the plurality of bits, is associated with the first quality of experience (QoE) configuration and wherein a second bit, in the plurality of bits, is associated with the second QoE configuration.

Clause 49. The apparatus of Clause 48, wherein a value of the first bit indicates information indicative of support for the first QoE configuration.

Clause 50. The apparatus of Clause 48 wherein a value of the second bit indicates support for the second QoE configuration.

Clause 51. The apparatus of Clause 47, wherein the information includes at least one of a first identifier of the first quality of experience (QoE) configuration and a second identifier of the second QoE configuration.

Clause 52. The apparatus of Clause 47, wherein the information is included in a radio resource control (RRC) resume message.

Clause 53. The apparatus of Clause 47, wherein the apparatus is further configured to receive system information, and wherein the information is based on the system information.

Clause 54. The apparatus of Clause 51, wherein the system information comprises a first system information block (SIB).

Clause 55. The apparatus of Clause 54, wherein the first SIB is a quality of experience (QoE)-related SIB.

Clause 56. The apparatus of Clause 43, wherein the first radio resource control (RRC) message is a RRC reconfiguration message.

Clause 57. The apparatus of Clause 43, wherein the radio resource control (RRC) release message comprises a suspend config information element (IE) indicating transitioning of the user equipment (apparatus) from the RRC connected state to the RRC inactive state.

Clause 58. The apparatus of Clause 57, wherein the suspend config information element (IE) comprises at least one of:

one or more radio network temporary identifiers (RNTIs);

a first parameter indicating a radio access network (PAN) paging cycle;

a second parameter indicating a RAN notification area; and one or more timer values.

Clause 59. The apparatus of Clause 43, wherein the radio resource control (RRC) resume message indicates restoring one or more configuration parameters for the user equipment (apparatus) after transitioning to the RRC connected state.

Clause 60. The apparatus of Clause 43, further comprising discarding one or more first measurement reports associated with the first quality of experience (QoE) configuration in response to receiving the radio resource control (RRC) resume message.

Clause 61. The apparatus of Clause 60, wherein the discarding the one or more first quality of experience (QoE) measurement reports occurs where the second base station (BS) does not support the first QoE configuration.

Clause 62. The apparatus of Clause 43, wherein the apparatus is further configured to:

perform, while the apparatus is in the radio resource control (RRC) inactive state, and in response to receiving the RRC release message, at least one of a quality of experience (QoE) measurement;

report the at least one a QoE measurement associated with the first QoE configuration and the second configuration; and perform, in response to receiving the RRC resume message, QoE measurement; and report the QoE measurement reporting associated with the second QoE configuration.

Clause 63. The apparatus of Clause 62 wherein the quality of experience (QoE) measurement reporting is via one or more radio resource control (RRC) messages.

Clause 64. The apparatus of Clause 63, wherein a quality of experience (QoE) measurement report is associated with a QoE-related signaling radio bearer (SRB).

Clause 65. The apparatus of Clause 64, wherein the quality of experience (QoE)-related signaling radio bearer (SRB) is SRB4.

Clause 66. The apparatus of Clause 64, wherein the quality of experience (QoE)-related signaling radio bearer (SRB) has a priority that is lower than a second SRB associated with an uplink common control channel logical channel.

Clause 67. The apparatus of Clause 62, wherein the one or more resource control (RRC) messages comprise a measurement report application layer information element (MeasReportappLayer IE) comprising the QoE measurement report.

Clause 68. The apparatus of Clause 62, wherein the quality of experience (QoE) measurement report comprises an identifier associated with a corresponding QoE configuration.

Clause 69. An apparatus for utilization in wireless communications comprising:

an antenna for use in transmission of electromagnetic signals;

a memory for maintaining computer-readable code; and a processor for executing the computer-readable code that causes the apparatus to:

receive a first radio resource control (RRC) message comprising configuration parameters of a QoE configuration;

receive an RRC release message indicating transitioning of the apparatus from an RRC connected state to an RRC inactive state;

receive an RRC resume message indicating transitioning of the apparatus from the RRC inactive state to the RRC connected state; and determine to discard or maintain a QoE measurement report associated with the QoE configuration in response to the RRC resume message indicating that at least one first configuration parameter of the configuration parameters is updated.

Clause 70. The apparatus of Clause 69, wherein the apparatus is further configured to assess the quality of experience (QoE) measurement report based on the determination to discard the QoE measurement report.

Clause 71. The apparatus of Clause 69, wherein the apparatus is further configured to maintain the quality of experience (QoE) measurement report based on the determination to maintain the QoE measurement report.

Clause 72. The apparatus of Clause 69, wherein the determination to discard or maintain the quality of experience (QoE) measurement report is based on the at least one first configuration parameter that is updated.

Clause 73. The apparatus of Clause 69, wherein the apparatus is further configured to discard the quality of experience (QoE) measurement report independent of a type of the at least one first configuration that is updated.

Clause 74. The apparatus of Clause 69, wherein the quality of experience (QoE) measurement report is based on QoE measurement performed during the radio resource control (RRC) inactive state.

Clause 75. The apparatus of Clause 69, wherein the radio resource control (RRC) release message comprises a suspend config information element (IE) indicating transitioning by the user equipment (apparatus) from the RRC connected state to the RRC inactive state.

Clause 76. The apparatus of Clause 75, wherein the suspend config information element (IE) comprises at least one of:

one or more radio network temporary identifiers (RNTIs);

a first parameter indicating a radio access network (PAN) paging cycle;

a second parameter indicating a RAN notification area; and one or more timer values.

Clause 77. The apparatus of Clause 69, wherein the radio resource control (RRC) resume message indicates restoring one or more configuration parameters for the user equipment (apparatus), after transitioning to the RRC connected state.

Clause 78. The apparatus of Clause 69, wherein the apparatus is further configured to perform, while in the radio resource control (RRC) inactive state, and in response to receiving the RRC release message, at least one of a quality of experience (QoE) measurement and reporting a QoE measurement associated with the QoE configuration.

Clause 79. The apparatus of Clause 78, wherein the quality of experience (QoE) measurement reporting is via one or more radio resource control (RRC) messages.

Clause 80. The apparatus of Clause 49, wherein a quality of experience (QoE) measurement reporting is associated with a QoE-related signaling radio bearer (SRB).

Clause 81. The apparatus of Clause 80, wherein the quality of experience (QoE)-related signaling radio bearer (SRB) is SRB4.

Clause 82. The apparatus of Clause 81, wherein the quality of experience (QoE)-related signaling radio bearer (SRB) has a priority that is lower than a priority of a second SRB associated with an uplink common control channel logical channel.

Clause 83. The apparatus of Clause 79, wherein the one or more radio resource control (RRC) messages comprise a measurement report application layer information element (MeasReportappLayer IE) comprising a quality of experience (QoE) measurement report.

Clause 84. The apparatus of Clause 79, wherein a quality of experience (QoE) measurement report comprises an identifier associated with a corresponding QoE configuration.

Clause 85. A method of quality of experience (QoE) measurement and reporting, comprising:

transmitting, by a network, a first radio resource control (RRC) message comprising first configuration parameters of a first QoE configuration and second configuration parameters of a second QoE configuration;

transmitting, by the network, an RRC release message indicating transitioning of a user equipment (UE) from an RRC connected state to an RRC inactive state, wherein the UE is in a connected state when the RRC release message is received;

transmitting, by the network, from a second BS, an RRC resume message indicating transitioning of the UE from the RRC inactive state to the RRC connected state, wherein the UE is in an inactive state when the RRC resume message is received; and wherein in response to receiving the RRC resume message, the first QoE configuration is released and the second QoE configuration is resumed.

Clause 86. A method of quality of experience (QoE) measurement and reporting, comprising:

transmitting, by a network, a first radio resource control (RRC) message comprising configuration parameters of a QoE configuration;

receiving an RRC release message indicating transitioning of a user equipment (UE) from an RRC connected state to an RRC inactive state; and transmitting, by a network, an RRC resume message indicating transitioning of the UE from the RRC inactive state to the RRC connected state, the UE determining to discard or maintain a QoE measurement report associated with the QoE configuration in response to the RRC resume message indicating that at least one first configuration parameter of the configuration parameters is updated.

Clause 87. An apparatus for utilization in wireless communications, comprising:

an antenna for use in transmission of electromagnetic signals;

a memory for maintaining computer-readable code; and a processor for executing the computer-readable code that causes the apparatus to:

transmit a first radio resource control (RRC) message comprising first configuration parameters of a first QoE configuration and second configuration parameters of a second QoE configuration;

transmit an RRC release message indicating transitioning of the apparatus from an RRC connected state to an RRC inactive state, wherein an apparatus is in a connected state when the RRC release message is received;

transmit from a second BS, an RRC resume message indicating transitioning of the apparatus from the RRC inactive state to the RRC connected state, wherein the apparatus is in an inactive state when the RRC resume message is received; and wherein in response to receiving the RRC resume message, wherein in response to receiving the RRC resume message, the first QoE configuration is released and the second QoE configuration is resumed.

Clause 88. An apparatus for utilization in wireless communications, comprising:

an antenna for use in transmission of electromagnetic signals;

a memory for maintaining computer-readable code; and a processor for executing the computer-readable code that causes the apparatus to:

transmit a first radio resource control (RRC) message comprising configuration parameters of a QoE configuration; transmit an RRC release message indicating transitioning of an apparatus from an RRC connected state to an RRC inactive state; and transmit an RRC resume message indicating transitioning of the apparatus from the RRC inactive state to the RRC connected state, the apparatus determining to discard or maintain a QoE measurement report associated with the QoE configuration in response to the RRC resume message indicating that at least one first configuration parameter of the configuration parameters is updated.

The invention claimed is:

1. A method of quality of experience (QoE) measurement and reporting, comprising:

receiving, by a user equipment (UE), from a first base station (BS), a first radio resource control (RRC) message comprising first configuration parameters of a first QoE configuration and second configuration parameters of a second QoE configuration;

receiving, by the UE, from the first BS, an RRC release message indicating transitioning of the UE from an RRC connected state to an RRC inactive state, wherein the UE is in the connected state when the RRC release message is received;

receiving, by the UE, from a second BS, an RRC resume message indicating transitioning of the UE from the RRC inactive state to the RRC connected state, wherein the UE is in the inactive state when the RRC resume message is received; and in response to receiving the RRC resume message, determining to discard a first QoE measurement report associated with the first QoE configuration and to maintain a second QoE measurement report associated with the second QoE configuration, wherein the second QoE measurement report is associated with a QoE-related signaling radio bearer (SRB) and the QoE-related SRB has a lower priority than a second SRB associated with an uplink common control logical channel.

2. The method of claim 1, wherein the second BS does not support the first QoE configuration.

3. The method of claim 1, wherein the second BS supports the second QoE configuration.

4. The method of claim 1, further comprising receiving information from the second BS that the second BS regarding support of at least one of the first QoE configuration or the second QoE configuration.

5. The method of claim 1, wherein the first RRC message is an RRC reconfiguration message.

6. The method of claim 1, wherein the RRC release message comprises a suspend config information element (IE) indicating transitioning of the UE from the RRC connected state to the RRC inactive state.

7. The method of claim 1, wherein the RRC resume message indicates restoring one or more configuration parameters for the UE after transitioning to the RRC connected state.

8. The method of claim 1, wherein the discarding the first QoE measurement report occurs where the second BS does not support the first QoE configuration.

9. The method of claim 1, wherein the second QoE measurement report is via one or more RRC messages.

10. The method of claim 1, wherein the QoE-related SRB is SRB 4.

11. The method of claim 1, wherein the one or more RRC messages comprise a measurement report application layer information element (MeasReportappLayer IE) comprising the second QoE measurement report.

12. The method of claim 1, wherein the second QoE measurement report comprises an identifier associated with a corresponding QoE configuration.

13. The method of claim 4, wherein the information includes at least one of a first identifier of the first QoE configuration and a second identifier of the second QoE configuration.

14. The method of claim 4, wherein the information is included in an RRC resume message.

15. The method of claim 4, further comprising receiving system information, and wherein the information is based on the system information.

16. The method of claim 6, wherein the suspend config information element (IE) comprises at least one of:
   one or more radio network temporary identifiers (RNTIs);
   a first parameter indicating a radio access network (RAN) paging cycle;
   a second parameter indicating a RAN notification area; and
   one or more timer values.

17. A method of quality of experience (QoE) measurement and reporting, comprising:
   receiving, by a user equipment (UE), a first radio resource control (RRC) message comprising configuration parameters of a QoE configuration;
   receiving, by the UE, an RRC release message indicating transitioning of the UE from an RRC connected state to an RRC inactive state;
   receiving, by the UE, an RRC resume message indicating transitioning of the UE from the RRC inactive state to the RRC connected state; and
   determining to discard or maintain a QoE measurement report associated with the QoE configuration in response to the RRC resume message indicating that at least one first configuration parameter of the configuration parameters a QoE configuration is updated,
   wherein the QoE measurement report is associated with a QoE-related signaling radio bearer (SRB) and the QoE-related SRB has a lower priority than a second SRB associated with an uplink common control logical channel.

18. A method of quality of experience (QoE) measurement and reporting, comprising:
   transmitting, by a base station (BS), to a user equipment (UE), a radio resource control (RRC) resume message indicating transitioning of the UE from an RRC inactive state to an RRC connected state, wherein the UE is in the inactive state when the RRC resume message is transmitted,
wherein the RRC resume message causes the UE to determine to discard a first QoE measurement report associated with a first QoE configuration and to maintain a second QoE measurement report associated with a second QoE configuration, first configuration parameters of the first QoE configuration and second configuration parameters of the second QoE configuration being included in a first RRC message received by the UE, and
wherein the second QoE measurement report is associated with a QoE-related signaling radio bearer (SRB) and the QoE-related SRB has a lower priority than a second SRB associated with an uplink common control logical channel.

19. A method of quality of experience (QoE) measurement and reporting, comprising:
   transmitting, by a base station (BS), to a user equipment (UE), a radio resource control (RRC) resume message indicating transitioning of the UE from an RRC inactive state to an RRC connected state,
   wherein, the RRC resume message indicating that at least one first configuration parameter of a QoE configuration is updated causes the UE to determine to discard or to maintain a QoE measurement report associated with the QoE configuration, the at least one first configuration parameter of the QoE configuration being included in a first RRC message received by the UE, and
   wherein the QoE measurement report is associated with a QoE-related signaling radio bearer (SRB) and the QoE-related SRB has a lower priority than a second SRB associated with an uplink common control logical channel.

* * * * *